(12) United States Patent
Vielliard

(10) Patent No.: US 12,104,486 B2
(45) Date of Patent: Oct. 1, 2024

(54) WATER DETECTION AND MEASUREMENT SYSTEM AND METHOD

(71) Applicant: SCHLUMBERGER TECHNOLOGY CORPORATION, Sugar Land, TX (US)

(72) Inventor: Christophe Marie Blaise Vielliard, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/044,642

(22) PCT Filed: Sep. 10, 2021

(86) PCT No.: PCT/US2021/049942
§ 371 (c)(1),
(2) Date: Mar. 9, 2023

(87) PCT Pub. No.: WO2022/056308
PCT Pub. Date: Mar. 17, 2022

(65) Prior Publication Data
US 2023/0399941 A1 Dec. 14, 2023

(30) Foreign Application Priority Data

Sep. 11, 2020 (EP) .................................. 20306017

(51) Int. Cl.
*E21B 47/10* (2012.01)
*E21B 47/001* (2012.01)
*E21B 47/07* (2012.01)

(52) U.S. Cl.
CPC ............ *E21B 47/10* (2013.01); *E21B 47/001* (2020.05); *E21B 47/07* (2020.05)

(58) Field of Classification Search
CPC ......... E21B 47/10; E21B 47/001; E21B 47/07
See application file for complete search history.

(56) References Cited

U.S. PATENT DOCUMENTS 6,831,470 B2    12/2004    Xie et al.
10,711,594 B2 *    7/2020    Rustad .................... E21B 37/06
(Continued)

OTHER PUBLICATIONS

International Preliminary Report on Patentability of International Patent Application No. PCT/US2021/049942 dated Mar. 23, 2023, 6 pages.

(Continued)

*Primary Examiner* — Crystal J Lee
(74) *Attorney, Agent, or Firm* — Jeffrey D. Frantz

(57) ABSTRACT

A water detection and measurement system for a resource extraction system includes a controller configured to receive first sensor signal(s) indicative of a pressure of a multiphase fluid and second sensor signal(s) indicative of a temperature of the multiphase fluid. Furthermore, the controller is configured to determine a fraction of condensed water within the multiphase fluid based on the pressure and the temperature. The controller is also configured to determine a flow rate of the condensed water based on the fraction of the condensed water within the multiphase fluid and a gas flow rate of the multiphase fluid. In addition, the controller is configured to receive third sensor signal(s) indicative of a fluid parameter of the multiphase fluid, and the controller is configured to determine a flow rate of formation water within the multiphase fluid based on the fluid parameter and the flow rate of the condensed water.

20 Claims, 5 Drawing Sheets

(56) References Cited

U.S. PATENT DOCUMENTS

| | | |
|---|---|---|
| 2011/0301877 A1 | 12/2011 | Wee |
| 2012/0046870 A1 | 2/2012 | Lievois et al. |
| 2012/0080587 A1 | 4/2012 | Lievois |
| 2014/0076547 A1* | 3/2014 | Unalmis .................. G01F 1/74 |
| | | 166/250.01 |

OTHER PUBLICATIONS

Exam Report under Section 18(3) issued in United Kingdom Patent Application No. 2303101.6 dated Mar. 25, 2024, 3 pages.

* cited by examiner

WATER DETECTION AND MEASUREMENT SYSTEM AND METHOD

CROSS-REFERENCE TO RELATED APPLICATIONS

This disclosure is a national stage entry under 35 U.S.C. 371 of International Application No. PCT/US2021/049942, filed Sep. 10, 2021, which claims the benefit of and priority to European Patent Application No. 20306017.3, titled "Water Detection and Measurement System and Method Background," filed Sep. 11, 2020, which is incorporated by reference herein in its entirety for all purposes.

BACKGROUND

The present disclosure relates generally to a water detection and measurement system and method.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Fluids (e.g., hydrocarbons) may be extracted from subsurface reservoirs and transported to the surface for commercial sale, such as for use in the power industry, transportation industry, manufacturing industry, and other applicable industries. For example, a well may be drilled into the ground to a subsurface reservoir, and equipment may be installed in the well and on the surface to facilitate extraction of the fluids. In some cases, the wells may be offshore (e.g., subsea), and the equipment may be disposed underwater, on offshore platforms, on floating systems, or a combination thereof.

Water and hydrate management is an aspect of subsea gas developments. Hydrates are formations of ice and gas that may form due to high pressures and low temperatures in hydrocarbon extraction environments. These hydrates may interfere with flow through the production systems. Many subsea gas wells produce no to very little formation water at start-up. In addition, the hydrocarbon gas in the reservoir is generally saturated with water vapor. At the wellhead or other location within the gas production system, some of the water vapor may condense and may be present as condensed or de-ionized water. Accordingly, there may be water in the vapor phase within the gas at the wellhead and throughout the production system, and thus further condensation of water may occur downstream of the wellhead.

Certain gas reservoirs may contain salty, interstitial formation water in the source rock, and/or certain gas reservoirs may be connected to aquifers containing salty formation water. It may be desirable for a well operator to continue producing hydrocarbon gas from a well even after that well has started to produce such formation water. The volumetric fraction of the formation water in the production fluid is generally very small, for example less than about 1 percent of the total volume. Accordingly, it may be difficult to accurately measure the flow rate of formation water. In addition, the formation water and the condensed water might mix as water is condensing out of the gas vapor phase in the wellbore, at the wellhead, further downstream in the production system, or a combination thereof.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a water detection and measurement system for a resource extraction system includes a controller comprising a memory and a processor. The controller is configured to receive one or more first sensor signals indicative of a pressure of a multiphase fluid. The controller is also configured to receive one or more second sensor signals indicative of a temperature of the multiphase fluid. Furthermore, the controller is configured to determine a fraction of condensed water within the multiphase fluid based on the pressure of the multiphase fluid and the temperature of the multiphase fluid. The controller is also configured to determine a flow rate of the condensed water based on the fraction of the condensed water within the multiphase fluid and a gas flow rate of the multiphase fluid. In addition, the controller is configured to receive one or more third sensor signals indicative of a fluid parameter of the multiphase fluid, and the controller is configured to determine a flow rate of formation water within the multiphase fluid based on the fluid parameter and the flow rate of the condensed water. The controller is also configured to output one or more output signals indicative of the flow rate of the formation water.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
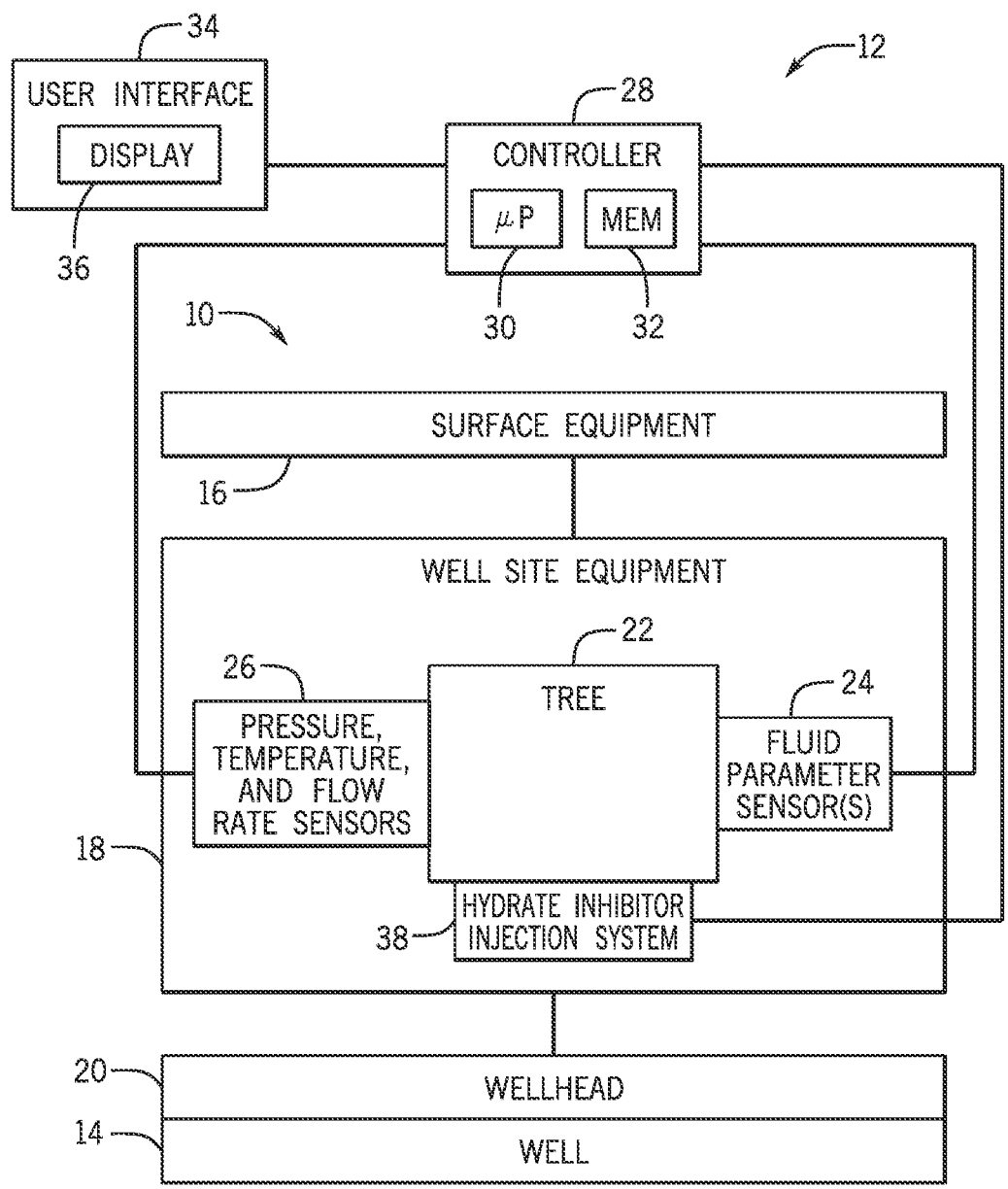
FIG. 1 is a block diagram of an embodiment of a resource extraction system having an embodiment of a water detection and measurement system.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

As explained above, certain gas reservoirs may contain salty, interstitial formation water in the source rock, and/or certain gas reservoirs may be connected to aquifers containing salty formation water. It may be desirable for a well operator to continue producing hydrocarbon gas from a well even after that well has started to produce such formation water. The volumetric fraction of the formation water in the production fluid (e.g., multiphase fluid) is generally very small, for example less than about 1 percent of the total volume. Accordingly, it may be difficult to accurately measure the flow rate of formation water within the production/multiphase fluid. In addition, the formation water and condensed water might mix as water is condensing out of the gas vapor phase in the wellbore, at the wellhead, further downstream in the production system, or a combination thereof.

In certain embodiments disclosed herein, a water detection and measurement system for a resource extraction system includes a controller having a memory and a processor. The controller is configured to receive one or more first sensor signals indicative of a pressure of a multiphase fluid (e.g., production fluid), and the controller is configured to receive one or more second sensor signals indicative of a temperature of the multiphase fluid. Furthermore, the controller is configured to determine a fraction of condensed water within the multiphase fluid based on the pressure of the multiphase fluid and the temperature of the multiphase fluid, and the controller is configured to determine a flow rate of the condensed water based on the fraction of the condensed water within the multiphase fluid and a gas flow rate (e.g., standard gas flow rate) of the multiphase fluid. In addition, the controller is configured to receive one or more third sensor signals indicative of a fluid parameter of the multiphase fluid (e.g., a water mixture salinity, a water liquid ratio, a water fraction, or a concentration of hydrate inhibitor). The controller is configured to determine a flow rate of formation water within the multiphase fluid based on the fluid parameter and the flow rate of the condensed water, and the controller is configured to output one or more output signals indicative of the flow rate of the formation water. Because the flow rate of the formation water is determined based on the flow rate of the condensed water, the accuracy of the formation water flow rate determination may be enhanced (e.g., as compared to a determination of formation water flow rate that does not utilize the flow rate of the condensed water).

U.S. Pat. No. 10,711,594, which is assigned to the present assignee and incorporated herein in its entirety, describes a system and method for determining the production rate of fluids in a gas well, more particularly for determining water flow rates in a gas production system from a gas well penetrating a subterranean formation.

FIG. 1 is a block diagram of an embodiment of a resource extraction system 10 (e.g., a mineral extraction system, a fluid extraction system, a hydrocarbon extraction system, a well system, etc.) having an embodiment of a water detection and measurement system 12. The resource extraction system may be employed within a subsea gas field development. In the illustrated embodiment, the resource extraction system 10 facilitates extraction of a resource, such as oil and/or natural gas in the form of a multiphase fluid, from a well 14. As shown, the resource extraction system 10 includes a variety of equipment, such as surface equipment 16 and well site equipment 18, for extracting the resource from the well 14 via a wellhead 20. The surface equipment 16 may include a variety of devices and systems, such as pumps, conduits, valves, power supplies, cable and hose reels, control units, a diverter, a gimbal, a spider, and the like. As shown, the well site equipment 18 includes a production tree 22, also commonly referred to as a "Christmas tree." The tree 22 may control the flow of an extracted resource out of the well 14 and upward toward the surface equipment 16. In addition, the tree 22 may include various valves, conduits, flow meters, sensors, and so forth. In certain embodiments, the well site equipment may be subsea (e.g., disposed on a floor of a body of water), and the surface equipment may be positioned at a surface of the body of water (e.g., on a boat, a platform, etc.). The water detection and measurement system disclosed herein may be employed within any suitable resource extraction system, including subsea systems and surface systems.

In the illustrated embodiment, the water detection and measurement system 12 includes one or more fluid parameter sensors 24 fluidly coupled to fluid passage(s) of the tree 22. Each fluid parameter sensor is configured to output one or more sensor signals (e.g., one or more third sensor signals) indicative of a fluid parameter of the multiphase fluid (e.g., multiphase effluent) within the respective fluid passage. In addition, in the illustrated embodiment, the water detection and measurement system 12 includes pressure, temperature, and flow rate sensors 26 fluidly coupled to fluid passage(s) of the tree 22 (e.g., the same fluid passage(s) as the one or more fluid parameter sensors). The pressure, temperature, and flow rate sensors 26 may include one or more pressure sensors, one or more temperature sensors, and one or more flow rate sensors. Each pressure sensor is configured to output one or more sensor signals (e.g., one or more first sensor signals) indicative of a pressure of a multiphase fluid within the respective flow passage. In addition, each temperature sensor is configured to output one or more sensor signals (e.g., one or more second sensor signals) indicative of a temperature of the multiphase fluid within the respective flow passage. Furthermore, each flow rate sensor is configured to output one or more sensor signals (e.g., one or more fourth sensor signals) indicative of a gas flow rate of the multiphase fluid through the respective flow passage. In certain embodiments, at least one sensor (e.g., each sensor disclosed above) is configured to output the one or more respective sensor signals in real-time or near real-time.

In the illustrated embodiment, the water detection and measurement system 12 includes a controller 28 communicatively coupled to the one or more fluid parameter sensors 24 and to the pressure, temperature, and flow rate sensors 26. As discussed in detail below, the controller 28 is configured to determine a flow rate of formation water based on the feedback from the fluid parameter sensor(s) 24 and the pressure, temperature, and flow rate sensors 26. In certain embodiments, the controller 28 is an electronic controller having electrical circuitry configured to receive the sensor signals and to determine the flow rate of the formation water. In the illustrated embodiment, the controller 28 includes a processor, such as the illustrated processor 30 (e.g., a microprocessor), and a memory device 32 (e.g., memory). The controller 28 may also include one or more storage devices and/or other suitable component(s). The processor 30 may be used to execute software, such as software for determining the flow rate of the formation water, and so forth. Moreover, the processor 30 may include multiple microprocessors, one or more "general-purpose" microprocessors, one or more special-purpose microprocessors, and/or one or more application specific integrated circuits (ASICs), or some combination thereof. For example, the processor 30 may include one or more reduced instruction set (RISC) processors.

The memory device 32 may include a volatile memory, such as random access memory (RAM), and/or a nonvolatile memory, such as read-only memory (ROM). The memory device 32 may store a variety of information and may be used for various purposes. For example, the memory device 32 may store processor-executable instructions (e.g., firmware or software) for the processor 30 to execute, such as instructions for determining the flow rate of the formation water, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for determining the flow rate of the formation water, etc.), and any other suitable data.

In the illustrated embodiment, the water detection and measurement system 12 includes a user interface 34 communicatively coupled to the controller 28. The user interface 34 is configured to receive input from a user and to provide information to the user. The user interface 34 may include any suitable input device(s) for receiving input, such as a keyboard, a mouse, button(s), switch(es), knob(s), other suitable input device(s), or a combination thereof. In addition, the user interface 34 may include any suitable output device(s) for presenting information to the user, such as a speaker, indicator light(s), other suitable output device(s), or a combination thereof. In the illustrated embodiment, the user interface 34 includes a display 36 configured to present visual information to the user. In certain embodiments, the display 36 may include a touchscreen interface configured to receive input from the user. Furthermore, the information determined through the methods disclosed herein may be presented in a graphical user interface (e.g., on the display) to facilitate human decision making concerning the production of subsea or onshore gas wells and injection of chemicals, for example. The information may also be transmitted to a central data repository (e.g., remote server) and may be processed (e.g., with other data pertaining to the production and operation of the well).

In certain embodiments, the controller 28 is configured to receive one or more sensor signals from a pressure sensor of the pressure, temperature, and flow rate sensors 26 indicative of a pressure of the multiphase fluid, and the controller 28 is configured to receive one or more sensor signals from a temperature sensor of the pressure, temperature, and flow rate sensors 26 indicative of a temperature of the multiphase fluid. In addition, the controller 28 is configured to determine a fraction of condensed water within the multiphase fluid based on the pressure of the multiphase fluid and the temperature of the multiphase fluid. The controller 28 is also configured to determine a flow rate of the condensed water based on the fraction of the condensed water within the multiphase fluid and a gas flow rate (e.g., standard gas flow rate) of the multiphase fluid. In certain embodiments, a flow rate sensor of the pressure, temperature, and flow rate sensors 26 may output sensor signal(s) indicative of the gas flow rate of the multiphase fluid. Furthermore, the controller 28 is configured to receive one or more sensor signals indicative of a fluid parameter of the multiphase fluid from the fluid parameter sensor(s) 24. As discussed in detail below, the fluid parameter may include water mixture salinity, water liquid ratio, water fraction, or concentration of a hydrate inhibitor. In addition, the controller 28 is configured to determine a flow rate of formation water based on the fluid parameter and the flow rate of the condensed water. Because the flow rate of the formation water is determined based on the flow rate of the condensed water, the accuracy of the formation water flow rate determination may be enhanced (e.g., as compared to a determination of formation water flow rate that does not utilize the flow rate of the condensed water, as compared to conventional wet-gas flow metering systems and methods, etc.). As a result, hydrate inhibitor injection flow rates may be more accurately determined and/or controlled, thereby reducing hydrate inhibitor usage and enabling system designs to be enhanced (e.g., by reducing engineering margins that address uncertainties).

The pressure, temperature, and flow rate sensors 26 may include any suitable type(s) of pressure sensor(s), any suitable type(s) of temperature sensor(s), and any suitable type(s) of flow rate sensor(s). Furthermore, in certain embodiments, the flow rate sensor(s) may be omitted (e.g., in embodiments in which the gas flow rate of the multiphase fluid is determined based on virtual flow estimation). In addition, the fluid parameter sensor(s) may include any suitable type(s) of fluid parameter sensor(s), such as salinity sensor(s), water liquid ratio sensor(s), water fraction sensor(s), hydrate inhibitor concentration sensor(s), or a combination thereof.

In the illustrated embodiment, the water detection and measurement system 12 includes a hydrate inhibitor injection system 38. The hydrate inhibitor injection system 38 is configured to inject hydrate inhibitor into the multiphase fluid. The hydrate inhibitor is configured to interact/mix with the water in the multiphase fluid to reduce formation of hydrates. The hydrate inhibitor may include mono-ethylene glycol (MEG), another suitable type of glycol, a suitable type of alcohol, a kinetic hydrate inhibitor (KHI), an anti-agglomerant (AA), any other suitable hydrate inhibitor(s), or a combination thereof.

In the illustrated embodiment, the hydrate inhibitor injection system 38 is communicatively coupled to the controller 28, and the controller 28 is configured to control the hydrate inhibitor injection system 38. For example, in certain embodiments, the controller 28 may control a flow rate of the hydrate inhibitor injected into the multiphase fluid based on the flow rate of the formation water. For example, in response to the flow rate of the formation water exceeding a threshold value, the controller 28 may control the hydrate inhibitor injection system 38 to increase the flow rate of the hydrate inhibitor injected into the multiphase fluid. Furthermore, in certain embodiments, in response to the flow rate of the formation water exceeding a threshold value, the controller 28 may instruct the user interface 34 (e.g., the display 36 of the user interface 34) to inform an operator of an excessive flow rate of the formation water. In addition, in certain embodiments, the controller 28 may terminate operation of the well 14/resource extraction system 10 in response to determining that the flow rate of the formation water exceeds a threshold value. In such embodiments, the controller may be communicatively coupled to one or more valves of the resource extraction system to enable the controller to terminate operation of the well/resource extraction system.

While the pressure, temperature, and flow rate sensors 26, the fluid parameter sensor(s) 24, and the hydrate inhibitor injection system 38 are fluidly coupled to the tree 22 (e.g., to fluid passage(s) of the tree 22) in the illustrated embodiment, in other embodiments, at least one sensor of the pressure, temperature, and flow rate sensors, at least one sensor of the fluid parameter sensor(s), the hydrate inhibitor injection system, or a combination thereof, may be fluidly coupled to fluid passage(s) of other suitable component(s) of the mineral resource extraction system 10. For example, at least one element of the water detection and measurement system may be fluidly coupled to a fluid passage of a manifold, a high integrity pressure protection system, a jumper, a pipeline end termination, an in-line tee, a pipeline end manifold, a manifold, an instrumented jumper, a subsea processing station, or another suitable component of the mineral extraction system. By way of further example, at least one element of the water detection and measurement system may be fluidly coupled to a component of the surface equipment, a component of the well site equipment, or a component of the wellhead. In certain embodiments, at least one element of the water detection and measurement system may be coupled to a module retrievably connected to a subsea production system. In such embodiments, the retrievable module may include the controller, at least a portion of the hydrate inhibitor injection system, the fluid parameter sensor(s), the pressure, temperature, and flow rate sensors, a chemical injection metering valve, a choke valve, or a combination thereof. The retrievable module may be located at the well head, at a jumper, at a pipeline end termination, at an in-line tee, at a pipeline end manifold, at a manifold, or at any other suitable part of a subsea production system. Furthermore, in certain embodiments, the controller may be communicatively coupled to a choke valve, a chemical injection metering valve (CIMV), an injection valve, an inflow control device, other suitable component(s), or a combination thereof (e.g., that may be located downhole in the well completion). In certain embodiments, the controller may control the component(s) on the basis of information determined through the methods disclosed herein.

Figure 2:
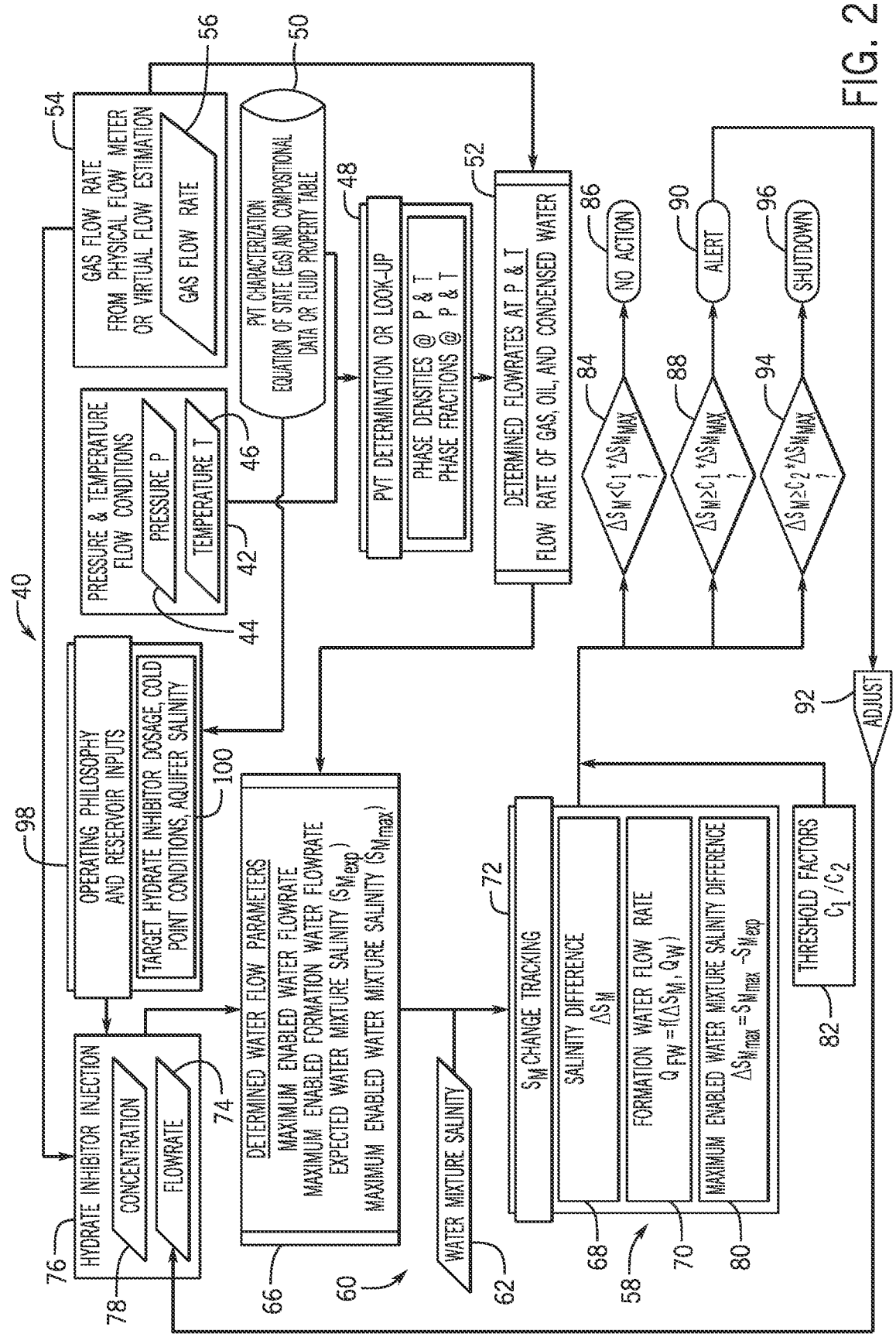
FIG. 2 is a flow diagram of an embodiment of a method for detecting and measuring water within a resource extraction system.

FIG. 2 is a flow diagram of an embodiment of a method 40 for detecting and measuring water within a resource extraction system. The method 40 may be performed by the controller disclosed above with reference to FIG. 1 and/or any other suitable controller(s). Furthermore, the steps of the method 40 may be performed in the order disclosed herein or in any other suitable order. For example, certain steps of the method may be performed concurrently. In addition, in certain embodiments, at least one of the steps of the method 40 may be omitted. At least a portion of the steps of the method may be performed continuously, repeatedly, periodically, in response to an event (e.g., sensor input), or a combination thereof.

As previously discussed, the pressure and the temperature of the multiphase fluid are monitored, as represented by block 42. The pressure of the multiphase fluid, as represented by block 44, may be monitored by one or more pressure sensors of the pressure, temperature, and flow rate sensors, and the temperature of the multiphase fluid, as represented by block 46, may be monitored by one or more temperature sensors of the pressure, temperature, and flow rate sensors. Furthermore, as previously discussed, a fraction (e.g., mass fraction, etc.) of the condensed water within the multiphase fluid is determined based on the pressure of the multiphase fluid and the temperature of the multiphase fluid, as represented by block 48. In certain embodiments, a fraction (e.g., mass fraction, etc.) of liquid hydrocarbon (e.g., oil) and/or a fraction (e.g., mass fraction, etc.) of gaseous hydrocarbon (e.g., hydrocarbon gas) may also be determined based on the pressure and temperature of the multiphase fluid. Furthermore, in certain embodiments, the density of the condensed water, the density of the liquid hydrocarbon, the density of the gaseous hydrocarbon, or a combination thereof, may also be determined based on the pressure and temperature of the multiphase fluid. The fraction(s) and density/densities may be determined based on a determination (e.g., calculation) process or a lookup table process. In the illustrated embodiment, the fraction(s) and density/densities are determined using pressure, volume, temperature (PVT) characterization data of the multiphase fluid, as represented by block 50. The PVT characterization data may include an equation of state and compositional data for the multiphase fluid to facilitate determination of the fraction(s) and density/densities based on a determination (e.g., calculation), and/or the PVT characterization data may include a fluid property table for the multiphase fluid to facilitate determination of the fraction(s) and density/densities based on the lookup table process.

Next, as represented by block 52, a flow rate of condensed water is determined based on the fraction of the condensed water within the multiphase fluid and a gas flow rate of the multiphase fluid. For example, the gas flow rate may be a standard gas flow rate (e.g., flow rate of gas at standard temperature and pressure) of the multiphase fluid. Gas flow rate data, as represented by block 54, includes the gas flow rate for the multiphase fluid, as represented by block 56. In certain embodiments, the gas flow rate for the multiphase fluid may be monitored by one or more flow rate sensors of the pressure, temperature, and flow rate sensors, as discussed above. Furthermore, in certain embodiments, the gas flow rate for the multiphase fluid may be determined using virtual flow estimation (e.g., including a simulation of the resource extraction system). Furthermore, in certain embodiments, the flow rate of liquid hydrocarbon (e.g., oil) and/or the flow rate of gaseous hydrocarbon (e.g., hydrocarbon gas) may be determined based on the respective fraction(s) of the hydrocarbon(s) and the gas flow rate of the multiphase fluid. Each determined flow rate may include a mass flow rate and/or a volumetric flow rate. For example, the mass flow rate may be determined based on the volumetric flow rate and the respective density, as determined in block 48, and/or the volumetric flow rate may be determined based on the mass flow rate and the respective density, as determined in block 48.

The flow rate of the formation water is determined based on a fluid parameter and the flow rate of the condensed water, as represented by section 58. As previously discussed, the fluid parameter, as represented by section 60, is received from a fluid parameter sensor. In the illustrated embodiment, the fluid parameter includes water mixture salinity, as represented by block 62, and the fluid parameter sensor includes a salinity sensor. The salinity sensor may utilize reflection of a microwave signal to enable measurement of the electromagnetic properties such as permittivity and conductivity of a multiphase fluid, such as a multiphase effluent flowing from a subsea well. In certain embodiments, such measurement may be obtained in real-time/near real-time and/or on a continuous basis. The measured electromagnetic properties of the fluid enable determination (e.g., by the controller(s)) of the water mixture salinity, as described for example in U.S. Pat. No. 6,831,470, entitled "Methods and apparatus for estimating on-line water conductivity of multiphase mixtures," which is incorporated by reference herein in its entirety. In certain embodiments, water salinity determination may also be achieved using local conductivity probes.

In the illustrated embodiment, the method 40 includes determining water flow parameters, as represented by block 66. Determining water flow parameters includes determining an expected water mixture salinity ($S_{Mexp}$) based on a salinity of the condensed water. Furthermore, in certain embodiments, the expected water mixture salinity may also be based on the flow rate of the condensed water, the salinity of the formation water, an initial determined flow rate of the formation water, an initial determined flow rate of the condensed water, or a combination thereof. In certain embodiments, the initial determined flow rate of the formation water and/or the initial determined flow rate of the condensed water may be determined during the initial startup of the well/resource extraction system. In addition, in certain embodiments, the salinity of the condensed water may be zero or substantially zero, the initial determined flow rate of the formation water may be zero or substantially zero, the initial determined flow rate of the condensed water may be zero or substantially zero, or a combination thereof. Furthermore, the salinity of the formation water may be determined (e.g., via direct measurement, via modeling, via geologic analysis, via subsea sampling and subsequent analysis, etc.).

Next, as represented by block 68, a salinity difference ($\Delta S_M$) is determined based on a difference between the water mixture salinity, as represented by block 62, and the expected water mixture salinity. The flow rate of the formation water ($Q_{FW}$) is then determined based on the salinity difference ($\Delta S_M$) and the flow rate of the condensed water ($Q_W$), as represented by block 70, which is within section 58. As previously discussed, the salinity of the formation water may be determined (e.g., via direct measurement, via modeling, via geologic analysis, via subsea sampling and subsequent analysis, etc.). Using the salinity of the formation water, the flow rate of the condensed water, and the salinity difference, the flow rate of the formation water may be determined. For example, a higher salinity difference may be indicative of a higher flow rate of the formation water, and a lower salinity difference may be indicative of a lower flow rate of the formation water. The formation water flow rate ($Q_{FW}$) may represent the total flow rate of the formation water or the difference between the total flow rate of the formation water and the initial determined flow rate of the formation water. As illustrated, blocks 68 and 70 are part of a change tracking block 72.

In certain embodiments, action(s) may be performed in response to determining the flow rate of the formation water is greater than or equal to a threshold value. In such embodiments, a maximum enabled water flow rate is determined based on a flow rate of a hydrate inhibitor into the multiphase fluid, as represented by block 66. The flow rate of the hydrate inhibitor, as represented by block 74, is a property of the hydrate inhibitor injection, as represented by block 76. The concentration of the hydrate inhibitor, as represented by block 78, is also a property of the hydrate inhibitor injection. As previously discussed, the hydrate inhibitor may be injected into the multiphase fluid via a hydrate inhibitor injection system, as shown in FIG. 1. The maximum enabled water flow rate corresponds to the flow rate of water that consumes/utilizes all or substantially all of the injected hydrate inhibitor to achieve a target or selected level of inhibition.

Next, as also represented by block 66, a maximum enabled formation water flow rate is determined based on the maximum enabled water flow rate and the flow rate of the condensed water. For example, the maximum enabled formation water flow rate may be determined based on a difference between the maximum enabled water flow rate and the flow rate of the condensed water. In certain embodiments, any water contained within the hydrate inhibitor may also be subtracted from the maximum enabled water flow rate to determine the maximum enabled formation water flow rate. A maximum enabled water mixture salinity ($S_{Mmax}$) may then be determined based on the maximum enabled formation water flow rate, the salinity of the formation water, and the flow rate of the condensed water, as also represented by block 66. The maximum enabled water mixture salinity corresponds to the salinity of the water mixture while the flow rate of the formation water is equal to the maximum enabled formation water flow rate.

As represented by block 80, which is part of the change tracking block 72, a maximum enabled water mixture salinity difference ($\Delta S_{Mmax}$) is determined based on a difference between the maximum enabled water mixture salinity ($S_{Mmax}$) and the expected water mixture salinity ($S_{Mexp}$). As discussed in detail below, an action may be performed in response to determining the salinity difference is greater than or equal to a threshold factor multiplied by the maximum enabled water mixture salinity difference. For example, the action may include informing an operator of an excessive flow rate of the formation water, terminating operation of the well/resource extraction system, controlling the flow rate of the hydrate inhibitor, or a combination thereof.

In the illustrated embodiment, two threshold factors ($C_1$, $C_2$) are input (e.g., via the user interface), as represented by block 82. In certain embodiments, each threshold factor may have a value between 0 and 1, and the second threshold factor may be greater than the first threshold factor. In response to determining that the salinity difference ($\Delta S_M$) is less than the first threshold factor ($C_1$) multiplied by the maximum enabled water mixture salinity difference ($\Delta S_{Mmax}$), as represented by block 84, no action is taken, as represented by block 86. While the salinity difference is less than the first threshold factor multiplied by the maximum enabled water mixture salinity difference, a sufficient amount of hydrate inhibitor is present within the multiphase fluid. Accordingly, an excessive flow rate of the formation water is not present. However, in response to determining that the salinity difference ($\Delta S_M$) is greater than or equal to the first threshold factor ($C_1$) multiplied by the maximum enabled water mixture salinity difference ($\Delta S_{Mmax}$), as represented by block 88, the operator may be informed (e.g., via the user interface) of an excessive flow rate of the formation water, as represented by block 90. In addition, in response to determining that the salinity difference ($\Delta S_M$) is greater than or equal to the first threshold factor ($C_1$) multiplied by the maximum enabled water mixture salinity difference ($\Delta S_{Mmax}$), as represented by block 88, the flow rate of the hydrate inhibitor into the multiphase fluid may be controlled based on the salinity difference, as represented by block 92. While the salinity difference is greater than or equal to the first threshold factor multiplied by the maximum enabled water mixture salinity difference, an insufficient or nearly insufficient amount of hydrate inhibitor may be present within the multiphase fluid. Accordingly, an excessive flow rate of the formation water may be present. Informing the operator may enable the operator to identify the excessive flow rate of the formation water. In addition, automatically controlling the flow rate of the hydrate inhibitor into the multiphase fluid may reduce the salinity difference below the first threshold factor multiplied by the maximum enabled water mixture salinity difference by increasing the maximum enabled formation water flow rate. While the operator is informed and the flow rate of the hydrate inhibitor is adjusted in response to determining the salinity difference is greater than or equal to the first threshold factor multiplied by the maximum enabled water mixture salinity difference in the illustrated embodiment, in other embodiments, only one of the actions may be performed.

In response to determining that the salinity difference ($\Delta S_M$) is greater than or equal to the second threshold factor ($C_2$) multiplied by the maximum enabled water mixture salinity difference ($\Delta S_{Mmax}$), as represented by block 94, operation of the well/resource extraction system may be terminated (e.g., by closing one or more valves of the resource extraction system), as represented by block 96. While operation of the well/resource extraction system is terminated in response to determining the salinity difference is greater than or equal to the second threshold factor multiplied by the maximum enabled water mixture salinity difference in the illustrated embodiment, in other embodiments, other and/or additional action(s) may be performed (e.g., informing the operator, adjusting operation of the resource extraction system, etc.). Furthermore, while the method 40 includes two threshold factors in the illustrated embodiment, in other embodiments, the method may include more or fewer threshold factors. For example, in certain embodiments, the method may include a single threshold factor, and one or more actions (e.g., informing the operator, terminating operation, controlling the hydrate inhibitor flow rate, etc.) may be performed in response to determining the salinity difference is greater than or equal to the single threshold factor multiplied by the maximum enabled water mixture salinity difference. Furthermore, in certain embodiments, the method may include three or more threshold factors, and for each respective threshold factor, one or more actions may be performed in response to determining the salinity difference is greater than or equal to the respective threshold factor multiplied by the maximum enabled water mixture salinity difference. In addition, in certain embodiments, the threshold factor may be omitted from at least one of the comparisons (e.g., the salinity difference may be compared directly to the maximum enabled water mixture salinity difference). Because the threshold value(s) used for comparison to the salinity difference are variable (e.g., based on the maximum enabled water mixture salinity difference), the action(s) may be initiated more accurately (e.g., as compared to a method that utilizes fixed threshold value(s)). However, in certain embodiments, the salinity difference may be compared to a fixed threshold value within at least one of the comparisons.

In the illustrated embodiment, the flow rate of the hydrate inhibitor into the multiphase fluid may be manually set/adjusted (e.g., prior to operation of the mineral extraction system, in response to being informed of an excessive flow rate of the formation water, etc.). The manual inputs to the hydrate inhibitor injection system are represented by block 98, which is labeled operating philosophy and reservoir inputs. As represented by block 100, which is an element of block 98, the inputs may include a target hydrate inhibitor dosage, cold point conditions, aquifer salinity (e.g., salinity of the formation water), or a combination thereof. The operating philosophy may include setting the target hydrate inhibitor dosage to a selected percentage above an expected maximum dosage to reduce the possibility of the flow rate of the formation water being excessive (e.g., greater than the capacity of the hydrate inhibitor) and to reduce hydrate inhibitor usage. Furthermore, in certain embodiments, the flow rate of the hydrate inhibitor into the multiphase fluid may be automatically controlled based at least in part on the gas flow rate, as represented by block 56.

Figure 3:
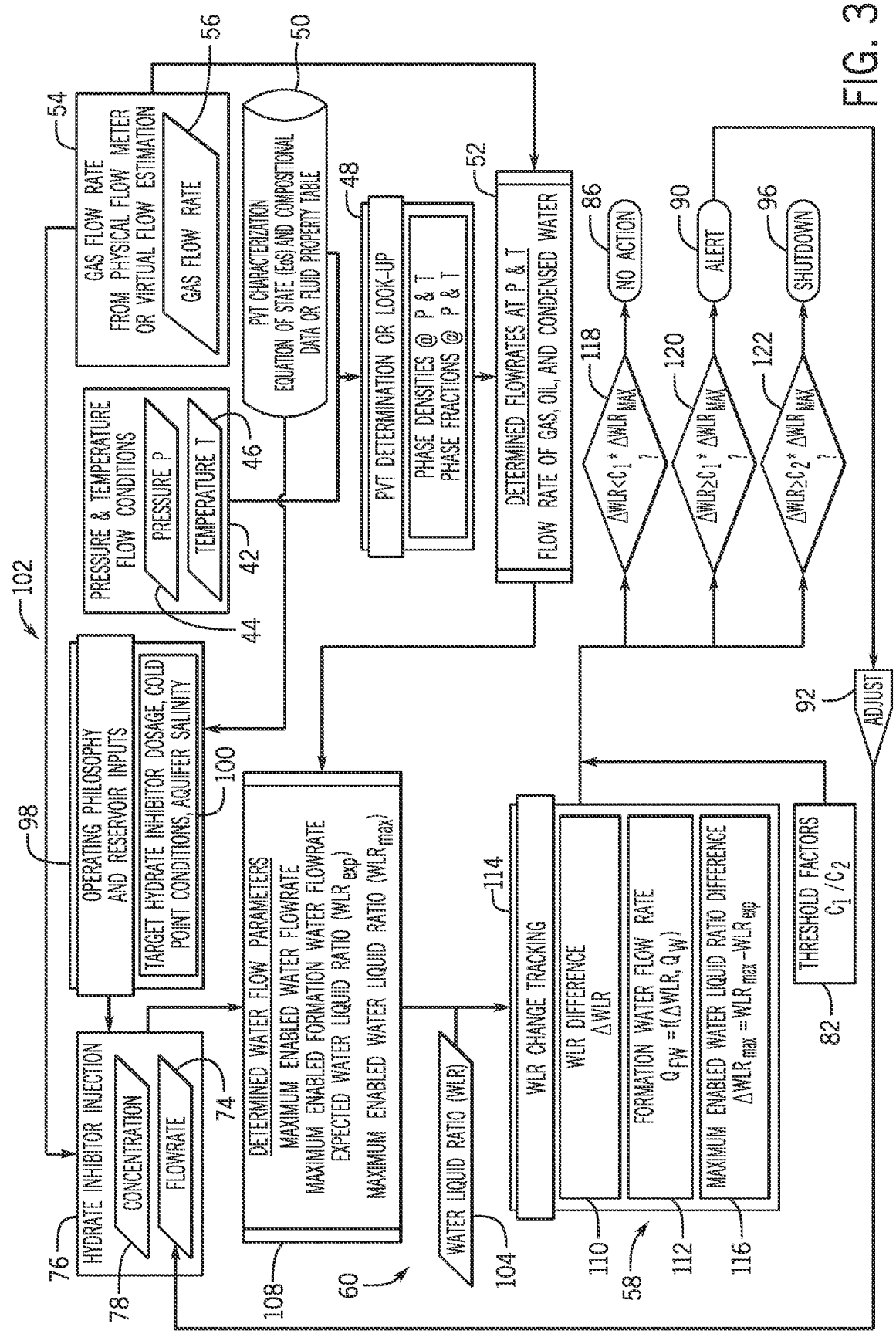
FIG. 3 is a flow diagram of another embodiment of a method for detecting and measuring water within a resource extraction system.

FIG. 3 is a flow diagram of another embodiment of a method 102 for detecting and measuring water within a resource extraction system. The method 102 may be performed by the controller disclosed above with reference to FIG. 1 and/or any other suitable controller(s). Furthermore, the steps of the method 102 may be performed in the order disclosed herein or in any other suitable order. For example, certain steps of the method may be performed concurrently. In addition, in certain embodiments, at least one of the steps of the method 102 may be omitted. At least a portion of the steps of the method may be performed continuously, repeatedly, periodically, in response to an event (e.g., sensor input), or a combination thereof.

As previously discussed, the pressure and the temperature of the multiphase fluid are monitored, as represented by block 42. The pressure of the multiphase fluid, as represented by block 44, may be monitored by one or more pressure sensors of the pressure, temperature, and flow rate sensors, and the temperature of the multiphase fluid, as represented by block 46, may be monitored by one or more temperature sensors of the pressure, temperature, and flow rate sensors. Furthermore, as previously discussed, a fraction (e.g., mass fraction, etc.) of the condensed water within the multiphase fluid is determined based on the pressure of the multiphase fluid and the temperature of the multiphase fluid, as represented by block 48. In addition, a fraction (e.g., mass fraction, etc.) of liquid hydrocarbon (e.g., oil) is determined based on the pressure and temperature of the multiphase fluid. In certain embodiments, a fraction (e.g., mass fraction, etc.) of gaseous hydrocarbon (e.g., hydrocarbon gas) may also be determined based on the pressure and temperature of the multiphase fluid. Furthermore, in certain embodiments, the density of the condensed water, the density of the liquid hydrocarbon, the density of the gaseous hydrocarbon, or a combination thereof, may also be determined based on the pressure and temperature of the multiphase fluid. The fraction(s) and density/densities may be determined based on a determination (e.g., calculation) process or a lookup table process. In the illustrated embodiment, the fraction(s) and density/densities are determined using pressure, volume, temperature (PVT) characterization data of the multiphase fluid, as represented by block 50. The PVT characterization data may include an equation of state and compositional data for the multiphase fluid to facilitate determination of the fraction(s) and density/densities based on a determination (e.g., calculation), and/or the PVT characterization data may include a fluid property table for the multiphase fluid to facilitate determination of the fraction(s) and density/densities based on the lookup table process.

Next, as represented by block 52, a flow rate of condensed water is determined based on the fraction of the condensed water within the multiphase fluid and a gas flow rate of the multiphase fluid. For example, the gas flow rate may be a standard gas flow rate (e.g., flow rate of gas at standard temperature and pressure) of the multiphase fluid. Gas flow rate data, as represented by block 54, includes the gas flow rate for the multiphase fluid, as represented by block 56. In certain embodiments, the gas flow rate for the multiphase fluid may be monitored by one or more flow rate sensors of the pressure, temperature, and flow rate sensors, as discussed above. Furthermore, in certain embodiments, the gas flow rate for the multiphase fluid may be determined using virtual flow estimation (e.g., including a simulation of the resource extraction system). In the illustrated embodiment, the flow rate of liquid hydrocarbon (e.g., oil) is determined based on the fraction of the liquid hydrocarbon and the gas flow rate of the multiphase fluid. Furthermore, in certain embodiments, the flow rate of gaseous hydrocarbon (e.g., hydrocarbon gas) may be determined based on the fraction of the gaseous hydrocarbon and the gas flow rate of the multiphase fluid. Each determined flow rate may include a mass flow rate and/or a volumetric flow rate. For example, the mass flow rate may be determined based on the volumetric flow rate and the respective density, as determined in block 48, and/or the volumetric flow rate may be determined based on the mass flow rate and the respective density, as determined in block 48.

The flow rate of the formation water is determined based on a fluid parameter and the flow rate of the condensed water, as represented by section 58. As previously discussed, the fluid parameter, as represented by section 60, is received from a fluid parameter sensor. In the illustrated embodiment, the fluid parameter includes water liquid ratio (WLR), as represented by block 104, and the fluid parameter sensor includes a WLR sensor. The water liquid ratio corresponds to a ratio (e.g., percentage) of water within the liquid of the multiphase fluid. The water liquid ratio sensor may utilize near-infrared (NIR) and/or mid-infrared (MIR) absorption and/or reflectance spectroscopy to provide local measurements of the water liquid ratio (WLR) for a multiphase fluid (e.g., effluent flowing from a subsea well). In certain embodiments, the WLR sensor may utilize local measurement of electromagnetic properties.

In the illustrated embodiment, the method includes determining water flow parameters, as represented by block 108. Determining water flow parameters includes determining an expected water liquid ratio ($WLR_{exp}$) based on the flow rate of the condensed water and the flow rate of the liquid hydrocarbon within the multiphase fluid. In certain embodiments, an initial determined flow rate of the formation water may also be included within the expected water liquid ratio determination. In certain embodiments, the initial determined flow rate of the formation water may be determined during the initial startup of the well/resource extraction system. Furthermore, in certain embodiments, the flow rate of the hydrate inhibitor, including any water within the hydrate inhibitor, may be included in the expected water liquid ratio determination, and/or an initial determined flow rate of condensed water may be included within the expected water liquid ratio determination. For example, in certain embodiments (e.g., in embodiments in which the initial determined flow rate of the formation water and the initial determined flow rate of the condensed water are zero), the expected water liquid ratio may be equal to the sum of the flow rates of the condensed water and any water within the hydrate inhibitor divided by the sum of the flow rates of the condensed water, the liquid hydrocarbon, and the hydrate inhibitor.

Next, as represented by block 110, a water liquid ratio difference (ΔWLR) is determined based on a difference between the water liquid ratio, as represented by block 104, and the expected water liquid ratio. The flow rate of the formation water ($Q_{FW}$) is then determined based on the water liquid ratio difference (ΔWLR) and the flow rate of the condensed water ($Q_W$), as represented by block 112, which is within section 58. In certain embodiments, the flow rate of the hydrate inhibitor, including any water within the hydrate inhibitor, may be included in the formation water flow rate determination. A higher liquid water ratio than expected (e.g., positive water liquid ratio difference) may indicate the presence of formation water, and the value of the water liquid ratio difference may be used to determine the flow rate of the formation water. The formation water flow rate ($Q_{FW}$) may represent the total flow rate of the formation water or the difference between the total flow rate of the formation water and the initial determined flow rate of the formation water. As illustrated, blocks 110 and 112 are part of a change tracking block 114.

In certain embodiments, action(s) may be performed in response to determining the flow rate of the formation water is greater than or equal to a threshold value. In such embodiments, a maximum enabled water flow rate is determined based on a flow rate of a hydrate inhibitor into the multiphase fluid, as represented by block 108. As previously discussed, the flow rate of the hydrate inhibitor, as represented by block 74, is a property of the hydrate inhibitor injection, as represented by block 76. The concentration of the hydrate inhibitor, as represented by block 78, is also a property of the hydrate inhibitor injection. As previously discussed, the hydrate inhibitor may be injected into the multiphase fluid via a hydrate inhibitor injection system, as shown in FIG. 1. The maximum enabled water flow rate corresponds to the flow rate of water that consumes/utilizes all or substantially all of the injected hydrate inhibitor to achieve a target or selected level of inhibition.

Next, as also represented by block 108, a maximum enabled formation water flow rate is determined based on the maximum enabled water flow rate and the flow rate of the condensed water. For example, the maximum enabled formation water flow rate may be determined based on a difference between the maximum enabled water flow rate and the flow rate of the condensed water. In certain embodiments, any water contained within the hydrate inhibitor may also be subtracted from the maximum enabled water flow rate to determine the maximum enabled formation water flow rate. A maximum enabled water liquid ratio ($WLR_{max}$) may then be determined based on the maximum enabled formation water flow rate, the flow rate of the condensed water, and the flow rate of the liquid hydrocarbon (e.g., oil), as also represented by block 108. In certain embodiments, the flow rate of the hydrate inhibitor, including any water within the hydrate inhibitor, the initial determined flow rate of the formation water, the initial determined flow rate of the condensed water, or a combination thereof, may be included in the maximum enabled water liquid ratio determination. For example, in certain embodiments (e.g., in embodiments in which the initial determined flow rate of the formation water and the initial determined flow rate of the condensed water are zero), the maximum enabled water liquid ratio may be equal to the sum of the condensed water flow rate, the maximum enabled formation water flow rate, and the flow rate of any water within the hydrate inhibitor divided by the sum of the condensed water flow rate, the maximum enabled formation water flow rate, the liquid hydrocarbon flow rate, and the hydrate inhibitor flow rate.

As represented by block 116, which is part of the change tracking block 114, a maximum enabled water liquid ratio difference ($\Delta WLR_{max}$) is determined based on a difference between the maximum enabled water liquid ratio ($WLR_{max}$) and the expected water liquid ratio ($WLR_{exp}$). As discussed in detail below, an action may be performed in response to determining the water liquid ratio difference is greater than or equal to a threshold factor multiplied by the maximum enabled water liquid ratio difference. For example, the action may include informing an operator of an excessive flow rate of the formation water, terminating operation of the well/resource extraction system, controlling the flow rate of the hydrate inhibitor, or a combination thereof.

In the illustrated embodiment, two threshold factors ($C_1$, $C_2$) are input (e.g., via the user interface), as represented by block 82. In certain embodiments, each threshold factor may have a value between 0 and 1, and the second threshold factor may be greater than the first threshold factor. In response to determining that the water liquid ratio difference ($\Delta WLR$) is less than the first threshold factor ($C_1$) multiplied by the maximum enabled water liquid ratio difference ($\Delta WLR_{max}$), as represented by block 118, no action is taken, as represented by block 86. While the water liquid ratio difference is less than the first threshold factor multiplied by the maximum enabled water liquid ratio difference, a sufficient amount of hydrate inhibitor is present within the multiphase fluid. Accordingly, an excessive flow rate of the formation water is not present. However, in response to determining that the water liquid ratio difference ($\Delta WLR$) is greater than or equal to the first threshold factor ($C_1$) multiplied by the maximum enabled water liquid ratio difference ($\Delta WLR_{max}$), as represented by block 120, the operator may be informed (e.g., via the user interface) of an excessive flow rate of the formation water, as represented by block 90. In addition, in response to determining that the water liquid ratio difference ($\Delta WLR$) is greater than or equal to the first threshold factor ($C_1$) multiplied by the maximum enabled water liquid ratio difference ($\Delta WLR_{max}$), as represented by block 120, the flow rate of the hydrate inhibitor into the multiphase fluid may be controlled based on the water liquid ratio difference, as represented by block 92. While the water liquid ratio difference is greater than or equal to the first threshold factor multiplied by the maximum enabled water liquid ratio difference, an insufficient or nearly insufficient amount of hydrate inhibitor may be present within the multiphase fluid. Accordingly, an excessive flow rate of the formation water may be present. Informing the operator may enable the operator to identify the excessive flow rate of the formation water. In addition, automatically controlling the flow rate of the hydrate inhibitor into the multiphase fluid may reduce the water liquid ratio difference below the first threshold factor multiplied by the maximum enabled water liquid ratio difference by increasing the maximum enabled formation water flow rate. While the operator is informed and the flow rate of the hydrate inhibitor is adjusted in response to determining the water liquid ratio difference is greater than or equal to the first threshold factor multiplied by the maximum enabled water liquid ratio difference in the illustrated embodiment, in other embodiments, only one of the actions may be performed.

In response to determining that the water liquid ratio difference ($\Delta WLR$) is greater than or equal to the second threshold factor ($C_2$) multiplied by the maximum enabled water liquid ratio difference ($\Delta WLR_{max}$), as represented by block 122, operation of the well/resource extraction system may be terminated (e.g., by closing one or more valves of the resource extraction system), as represented by block 96. While operation of the well/resource extraction system is terminated in response to determining the water liquid ratio difference is greater than or equal to the second threshold factor multiplied by the maximum enabled water liquid ratio difference in the illustrated embodiment, in other embodiments, other and/or additional action(s) may be performed (e.g., informing the operator, adjusting operation of the resource extraction system, etc.). Furthermore, while the method 102 includes two threshold factors in the illustrated embodiment, in other embodiments, the method may include more or fewer threshold factors. For example, in certain embodiments, the method may include a single threshold factor, and one or more actions (e.g., informing the operator, terminating operation, controlling the hydrate inhibitor flow rate, etc.) may be performed in response to determining the water liquid ratio difference is greater than or equal to the single threshold factor multiplied by the maximum enabled water liquid ratio difference. Furthermore, in certain embodiments, the method may include three or more threshold factors, and for each respective threshold factor, one or more actions may be performed in response to determining the water liquid ratio difference is greater than or equal to the respective threshold factor multiplied by the maximum enabled water liquid ratio difference. In addition, in certain embodiments, the threshold factor may be omitted from at least one of the comparisons (e.g., the water liquid ratio difference may be compared directly to the maximum enabled water liquid ratio difference). Because the threshold value(s) used for comparison to the water liquid ratio difference are variable (e.g., based on the maximum enabled water liquid ratio difference), the action(s) may be initiated more accurately (e.g., as compared to a method that utilizes fixed threshold value(s)). However, in certain embodiments, the water liquid ratio difference may be compared to a fixed threshold value within at least one of the comparisons.

In the illustrated embodiment, the flow rate of the hydrate inhibitor into the multiphase fluid may be manually set/adjusted (e.g., prior to operation of the mineral extraction system, in response to being informed of an excessive flow rate of the formation water, etc.). The manual inputs to the hydrate inhibitor injection system are represented by block 98, which is labeled operating philosophy and reservoir inputs. As represented by block 100, which is an element of block 98, the inputs may include a target hydrate inhibitor dosage, cold point conditions, aquifer salinity (e.g., salinity of the formation water), or a combination thereof. The operating philosophy may include setting the target hydrate inhibitor dosage to a selected percentage above an expected maximum dosage to reduce the possibility of the flow rate of the formation water being excessive (e.g., greater than the capacity of the hydrate inhibitor) and to reduce hydrate inhibitor usage. Furthermore, in certain embodiments, the flow rate of the hydrate inhibitor into the multiphase fluid may be automatically controlled based at least in part on the gas flow rate, as represented by block 56.

Figure 4:
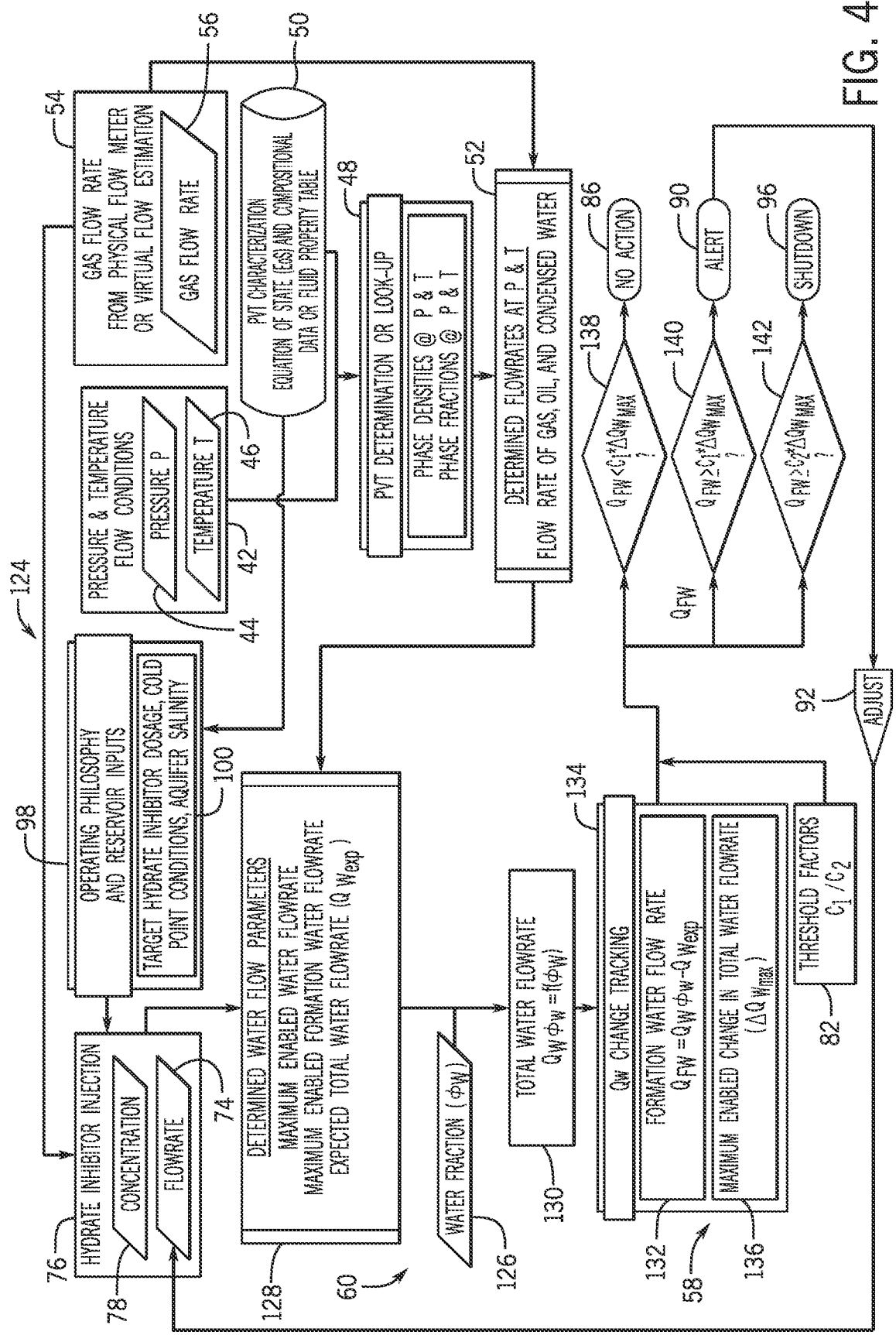
FIG. 4 is a flow diagram of a further embodiment of a method for detecting and measuring water within a resource extraction system.

FIG. 4 is a flow diagram of a further embodiment of a method 124 for detecting and measuring water within a resource extraction system. The method 124 may be performed by the controller disclosed above with reference to FIG. 1 and/or any other suitable controller(s). Furthermore, the steps of the method 124 may be performed in the order disclosed herein or in any other suitable order. For example, certain steps of the method may be performed concurrently. In addition, in certain embodiments, at least one of the steps of the method 124 may be omitted. At least a portion of the steps of the method may be performed continuously, repeatedly, periodically, in response to an event (e.g., sensor input), or a combination thereof.

As previously discussed, the pressure and the temperature of the multiphase fluid are monitored, as represented by block 42. The pressure of the multiphase fluid, as represented by block 44, may be monitored by one or more pressure sensors of the pressure, temperature, and flow rate sensors, and the temperature of the multiphase fluid, as represented by block 46, may be monitored by one or more temperature sensors of the pressure, temperature, and flow rate sensors. Furthermore, as previously discussed, a fraction (e.g., mass fraction, etc.) of the condensed water within the multiphase fluid is determined based on the pressure of the multiphase fluid and the temperature of the multiphase fluid, as represented by block 48. In certain embodiments, a fraction (e.g., mass fraction, etc.) of liquid hydrocarbon (e.g., oil) and/or a fraction (e.g., mass fraction, etc.) of gaseous hydrocarbon (e.g., hydrocarbon gas) may also be determined based on the pressure and temperature of the multiphase fluid. Furthermore, in certain embodiments, the density of the condensed water, the density of the liquid hydrocarbon, the density of the gaseous hydrocarbon, or a combination thereof, may also be determined based on the pressure and temperature of the multiphase fluid. The fraction(s) and density/densities may be determined based on a determination (e.g., calculation) process or a lookup table process. In the illustrated embodiment, the fraction(s) and density/densities are determined using pressure, volume, temperature (PVT) characterization data of the multiphase fluid, as represented by block 50. The PVT characterization data may include an equation of state and compositional data for the multiphase fluid to facilitate determination of the fraction(s) and density/densities based on a determination (e.g., calculation), and/or the PVT characterization data may include a fluid property table for the multiphase fluid to facilitate determination of the fraction(s) and density/densities based on the lookup table process.

Next, as represented by block 52, a flow rate of condensed water is determined based on the fraction of the condensed water within the multiphase fluid and a gas flow rate of the multiphase fluid. For example, the gas flow rate may be a standard gas flow rate (e.g., flow rate of gas at standard temperature and pressure) of the multiphase fluid. Gas flow rate data, as represented by block 54, includes the gas flow rate for the multiphase fluid, as represented by block 56. In certain embodiments, the gas flow rate for the multiphase fluid may be monitored by one or more flow rate sensors of the pressure, temperature, and flow rate sensors, as discussed above. Furthermore, in certain embodiments, the gas flow rate for the multiphase fluid may be determined using virtual flow estimation (e.g., including a simulation of the resource extraction system). Furthermore, in certain embodiments, the flow rate of liquid hydrocarbon (e.g., oil) and/or the flow rate of gaseous hydrocarbon (e.g., hydrocarbon gas) may be determined based on the respective fraction(s) of the hydrocarbon(s) and the gas flow rate of the multiphase fluid. Each determined flow rate may include a mass flow rate and/or a volumetric flow rate. For example, the mass flow rate may be determined based on the volumetric flow rate and the respective density, as determined in block 48, and/or the volumetric flow rate may be determined based on the mass flow rate and the respective density, as determined in block 48.

The flow rate of the formation water is determined based on a fluid parameter and the flow rate of the condensed water, as represented by section 58. As previously discussed, the fluid parameter, as represented by section 60, is received from a fluid parameter sensor. In the illustrated embodiment, the fluid parameter includes a water fraction ($\Phi_W$) within a volume of inspection, as represented by block 126, and the fluid parameter sensor includes a water fraction sensor. The water fraction sensor may utilize near-infrared (NIR) and/or mid-infrared (MIR) absorption and/or reflectance spectroscopy to provide the local fraction of water within the sensor volume of inspection for a multiphase fluid (e.g., effluent flowing from a subsea well).

In the illustrated embodiment, the method includes determining water flow parameters, as represented by block 128. Determining water flow parameters includes determining an expected total water flow rate ($Q_{Wexp}$) based on the flow rate of the condensed water. In certain embodiments, the flow rate of any water within the hydrate inhibitor, an initial determined flow rate of the formation water, an initial determined flow rate of the condensed water, or a combination thereof, may be included in the expected total water flow rate determination. In certain embodiments, the initial determined flow rate of the formation water and/or the initial determined flow rate of the condensed water may be determined during the initial startup of the well/resource extraction system. For example, in certain embodiments (e.g., in embodiments in which the initial determined flow rate of the formation water and the initial determined flow rate of the condensed water are zero), the expected total water flow rate may be equal to the sum of the flow rate of the condensed water and the flow rate of any water within the hydrate inhibitor.

Next, as represented by block 130, a total water flow rate ($Q_{W\Phi W}$) is determined based on the water fraction ($\Phi_W$), as represented by block 126. For example, the total water flow rate may be equal to the water fraction multiplied by a coefficient. In certain embodiments, the coefficient may be determined by dividing the expected total water flow rate by a water fraction determined while no formation water is present within the multiphase fluid. The flow rate of the formation water ($Q_{FW}$) is then determined based on a difference between the total water flow rate ($Q_{W\Phi W}$) and the expected total water flow rate ($Q_{Wexp}$), as represented by block 132, which is within section 58. In the illustrated embodiment, the flow rate of the formation water represents a difference between the total formation water flow rate and the initial determined flow rate of the formation water. However, in certain embodiments, the total formation water flow rate may be determined by adding the flow rate of the formation water ($Q_{FW}$) to the initial determined flow rate of the formation water. As illustrated, block 132 is part of a change tracking block 134.

In certain embodiments, action(s) may be performed in response to determining the flow rate of the formation water is greater than or equal to a threshold value. In such embodiments, a maximum enabled water flow rate is determined based on a flow rate of a hydrate inhibitor into the multiphase fluid, as represented by block 128. As previously discussed, the flow rate of the hydrate inhibitor, as represented by block 74, is a property of the hydrate inhibitor injection, as represented by block 76. The concentration of the hydrate inhibitor, as represented by block 78, is also a property of the hydrate inhibitor injection. As previously discussed, the hydrate inhibitor may be injected into the multiphase fluid via a hydrate inhibitor injection system, as shown in FIG. 1. The maximum enabled water flow rate corresponds to the flow rate of water that consumes/utilizes all or substantially all of the injected hydrate inhibitor to achieve a target or selected level of inhibition.

Next, as also represented by block 128, a maximum enabled formation water flow rate is determined based on the maximum enabled water flow rate and the flow rate of the condensed water. For example, the maximum enabled formation water flow rate may be determined based on a difference between the maximum enabled water flow rate and the flow rate of the condensed water. In certain embodiments, any water contained within the hydrate inhibitor may also be subtracted from the maximum enabled water flow rate to determine the maximum enabled formation water flow rate. A maximum enabled change in total water flow rate ($\Delta Q_{Wmax}$) is then determined based on the maximum enabled formation water flow rate, as represented by block 136, which is part of the changed tracking block 134. In certain embodiments, the multiphase fluid may include an initial determined flow rate of formation water and/or an initial determined flow rate of condensed water, which may be determined during the initial startup of the well/resource extraction system. In such embodiments, the maximum enabled change in total water flow rate may be equal to the maximum enabled formation water flow rate minus the initial determined flow rate of the formation water and/or the initial determined flow rate of the condensed water. However, in certain embodiments, the initial determined flow rate of formation water and the initial determined flow rate of the condensed water may be zero, and the maximum enabled change in total water flow rate may be equal to the maximum enabled formation water flow rate. As discussed in detail below, an action may be performed in response to determining the formation water flow rate is greater than or equal to a threshold factor multiplied by the maximum enabled change in total water flow rate. For example, the action may include informing an operator of an excessive flow rate of the formation water, terminating operation of the well/resource extraction system, controlling the flow rate of the hydrate inhibitor, or a combination thereof.

In the illustrated embodiment, two threshold factors ($C_1$, $C_2$) are input (e.g., via the user interface), as represented by block 82. In certain embodiments, each threshold factor may have a value between 0 and 1, and the second threshold factor may be greater than the first threshold factor. In response to determining that the formation water flow rate ($Q_{FW}$) is less than the first threshold factor ($C_1$) multiplied by the maximum enabled change in total water flow rate ($\Delta Q_{Wmax}$), as represented by block 138, no action is taken, as represented by block 86. While the formation water flow rate is less than the first threshold factor multiplied by the maximum enabled change in total water flow rate, a sufficient amount of hydrate inhibitor is present within the multiphase fluid. Accordingly, an excessive flow rate of the formation water is not present. However, in response to determining that the formation water flow rate ($Q_{FW}$) is greater than or equal to the first threshold factor ($C_1$) multiplied by the maximum enabled change in total water flow rate ($\Delta Q_{Wmax}$), as represented by block 140, the operator may be informed (e.g., via the user interface) of an excessive flow rate of the formation water, as represented by block 90. In addition, in response to determining that the formation water flow rate ($Q_{FW}$) is greater than or equal to the first threshold factor ($C_1$) multiplied by the maximum enabled change in total water flow rate ($\Delta Q_{Wmax}$), as represented by block 140, the flow rate of the hydrate inhibitor into the multiphase fluid may be controlled based on the formation water flow rate, as represented by block 92. While the formation water flow rate is greater than or equal to the first threshold factor multiplied by the maximum enabled change in total water flow rate, an insufficient or nearly insufficient amount of hydrate inhibitor may be present within the multiphase fluid. Accordingly, an excessive flow rate of the formation water may be present. Informing the operator may enable the operator to identify the excessive flow rate of the formation water. In addition, automatically controlling the flow rate of the hydrate inhibitor into the multiphase fluid may reduce the formation water flow rate below the first threshold factor multiplied by the maximum enabled change in total water flow rate by increasing the maximum enabled formation water flow rate. While the operator is informed and the flow rate of the hydrate inhibitor is adjusted in response to determining the formation water flow rate is greater than or equal to the first threshold factor multiplied by the maximum enabled change in total water flow rate in the illustrated embodiment, in other embodiments, only one of the actions may be performed.

In response to determining that the formation water flow rate ($Q_{FW}$) is greater than or equal to the second threshold factor ($C_2$) multiplied by the maximum enabled change in total water flow rate ($\Delta Q_{Wmax}$), as represented by block 142, operation of the well/resource extraction system may be terminated (e.g., by closing one or more valves of the resource extraction system), as represented by block 96. While operation of the well/resource extraction system is terminated in response to determining the formation water flow rate is greater than or equal to the second threshold factor multiplied by the maximum enabled change in total water flow rate in the illustrated embodiment, in other embodiments, other and/or additional action(s) may be performed (e.g., informing the operator, adjusting operation of the resource extraction system, etc.). Furthermore, while the method 124 includes two threshold factors in the illustrated embodiment, in other embodiments, the method may include more or fewer threshold factors. For example, in certain embodiments, the method may include a single threshold factor, and one or more actions (e.g., informing the operator, terminating operation, controlling the hydrate inhibitor flow rate, etc.) may be performed in response to determining the formation water flow rate is greater than or equal to the single threshold factor multiplied by the maximum enabled change in total water flow rate. Furthermore, in certain embodiments, the method may include three or more threshold factors, and for each respective threshold factor, one or more actions may be performed in response to determining the formation water flow rate is greater than or equal to the respective threshold factor multiplied by the maximum enabled change in total water flow rate. In addition, in certain embodiments, the threshold factor may be omitted from at least one of the comparisons (e.g., the formation water flow rate may be compared directly to the maximum enabled change in total water flow rate). Because the threshold value(s) used for comparison to the formation water flow rate are variable (e.g., based on the maximum enabled change in total water flow rate), the action(s) may be initiated more accurately (e.g., as compared to a method that utilizes fixed threshold value(s)). However, in certain embodiments, the formation water flow rate may be compared to a fixed threshold value within at least one of the comparisons.

In the illustrated embodiment, the flow rate of the hydrate inhibitor into the multiphase fluid may be manually set/adjusted (e.g., prior to operation of the mineral extraction system, in response to being informed of an excessive flow rate of the formation water, etc.). The manual inputs to the hydrate inhibitor injection system are represented by block 98, which is labeled operating philosophy and reservoir inputs. As represented by block 100, which is an element of block 98, the inputs may include a target hydrate inhibitor dosage, cold point conditions, aquifer salinity (e.g., salinity of the formation water), or a combination thereof. The operating philosophy may include setting the target hydrate inhibitor dosage to a selected percentage above an expected maximum dosage to reduce the possibility of the flow rate of the formation water being excessive (e.g., greater than the capacity of the hydrate inhibitor) and to reduce hydrate inhibitor usage. Furthermore, in certain embodiments, the flow rate of the hydrate inhibitor into the multiphase fluid may be automatically controlled based at least in part on the gas flow rate, as represented by block 56.

Figure 5:
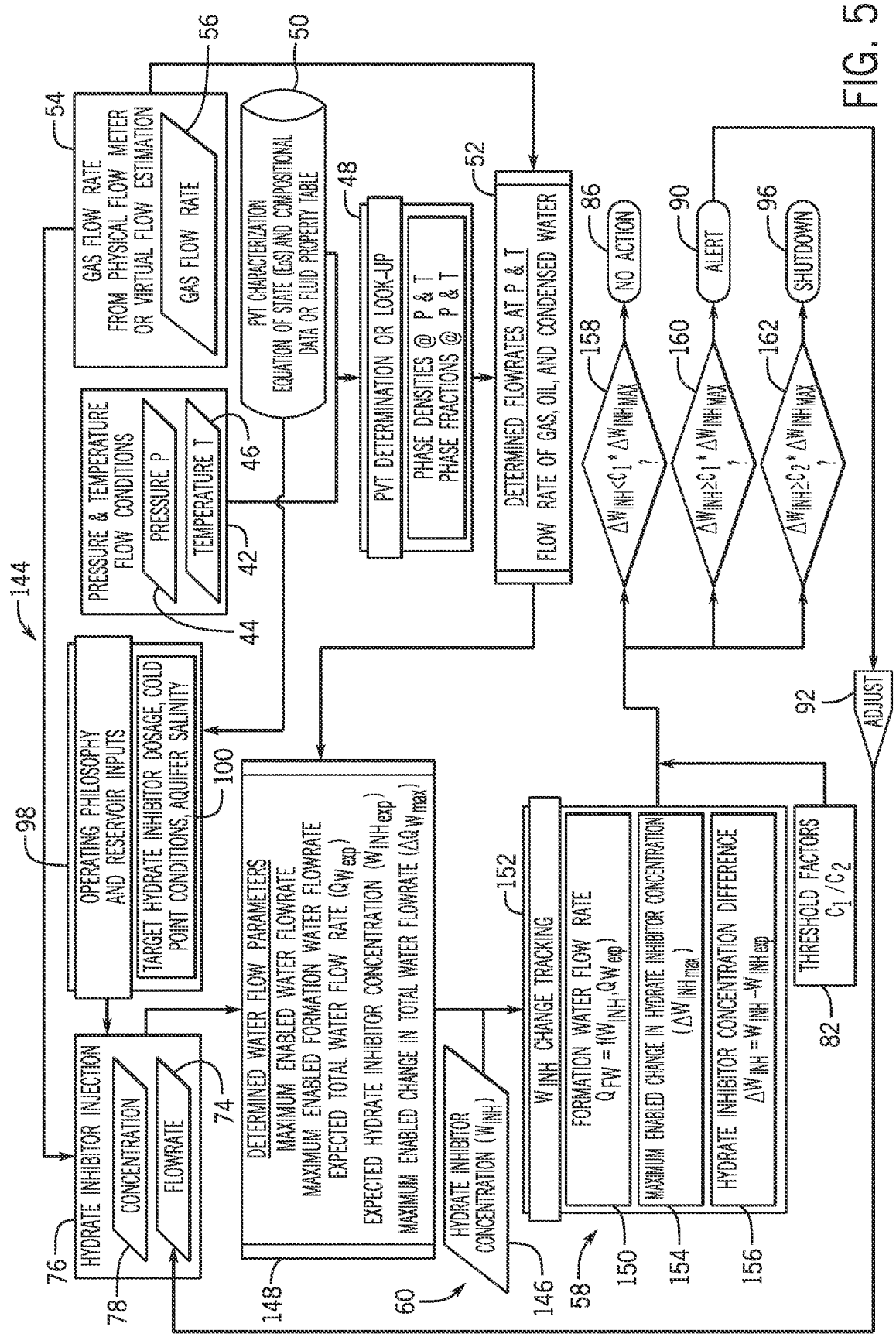
FIG. 5 is a flow diagram of an embodiment of a method for detecting and measuring water within a resource extraction system.

FIG. 5 is a flow diagram of an embodiment of a method 144 for detecting and measuring water within a resource extraction system. The method 144 may be performed by the controller disclosed above with reference to FIG. 1 and/or any other suitable controller(s). Furthermore, the steps of the method 144 may be performed in the order disclosed herein or in any other suitable order. For example, certain steps of the method may be performed concurrently. In addition, in certain embodiments, at least one of the steps of the method 144 may be omitted. At least a portion of the steps of the method may be performed continuously, repeatedly, periodically, in response to an event (e.g., sensor input), or a combination thereof.

As previously discussed, the pressure and the temperature of the multiphase fluid are monitored, as represented by block 42. The pressure of the multiphase fluid, as represented by block 44, may be monitored by one or more pressure sensors of the pressure, temperature, and flow rate sensors, and the temperature of the multiphase fluid, as represented by block 46, may be monitored by one or more temperature sensors of the pressure, temperature, and flow rate sensors. Furthermore, as previously discussed, a fraction (e.g., mass fraction, etc.) of the condensed water within the multiphase fluid is determined based on the pressure of the multiphase fluid and the temperature of the multiphase fluid, as represented by block 48. In certain embodiments, a fraction (e.g., mass fraction, etc.) of liquid hydrocarbon (e.g., oil) and/or a fraction (e.g., mass fraction, etc.) of gaseous hydrocarbon (e.g., hydrocarbon gas) may also be determined based on the pressure and temperature of the multiphase fluid. Furthermore, in certain embodiments, the density of the condensed water, the density of the liquid hydrocarbon, the density of the gaseous hydrocarbon, or a combination thereof, may also be determined based on the pressure and temperature of the multiphase fluid. The fraction(s) and density/densities may be determined based on a determination (e.g., calculation) process or a lookup table process. In the illustrated embodiment, the fraction(s) and density/densities are determined using pressure, volume, temperature (PVT) characterization data of the multiphase fluid, as represented by block 50. The PVT characterization data may include an equation of state and compositional data for the multiphase fluid to facilitate determination of the fraction(s) and density/densities based on a determination (e.g., calculation), and/or the PVT characterization data may include a fluid property table for the multiphase fluid to facilitate determination of the fraction(s) and density/densities based on the lookup table process.

Next, as represented by block 52, a flow rate of condensed water is determined based on the fraction of the condensed water within the multiphase fluid and a gas flow rate of the multiphase fluid. For example, the gas flow rate may be a standard gas flow rate (e.g., flow rate of gas at standard temperature and pressure) of the multiphase fluid. Gas flow rate data, as represented by block 54, includes the gas flow rate for the multiphase fluid, as represented by block 56. In certain embodiments, the gas flow rate for the multiphase fluid may be monitored by one or more flow rate sensors of the pressure, temperature, and flow rate sensors, as discussed above. Furthermore, in certain embodiments, the gas flow rate for the multiphase fluid may be determined using virtual flow estimation (e.g., including a simulation of the resource extraction system). Furthermore, in certain embodiments, the flow rate of liquid hydrocarbon (e.g., oil) and/or the flow rate of gaseous hydrocarbon (e.g., hydrocarbon gas) may be determined based on the respective fraction(s) of the hydrocarbon(s) and the gas flow rate of the multiphase fluid. Each determined flow rate may include a mass flow rate and/or a volumetric flow rate. For example, the mass flow rate may be determined based on the volumetric flow rate and the respective density, as determined in block 48, and/or the volumetric flow rate may be determined based on the mass flow rate and the respective density, as determined in block 48.

The flow rate of the formation water is determined based on a fluid parameter and the flow rate of the condensed water, as represented by section 58. As previously discussed, the fluid parameter, as represented by section 60, is received from a fluid parameter sensor. In the illustrated embodiment, the fluid parameter includes a concentration (e.g., weight percent, etc.) of hydrate inhibitor ($W_{INH}$) within the multiphase fluid (e.g., after the hydrate inhibitor is well-mixed with the water within the multiphase fluid), as represented by block 146, and the fluid parameter sensor includes a hydrate inhibitor concentration sensor. The hydrate inhibitor concentration sensor may utilize near-infrared (NIR) and/or mid-infrared (MIR) absorption and/or reflectance spectroscopy to facilitate determination of the hydrate inhibitor concentration. Additionally or alternatively, the hydrate inhibitor concentration sensor may include an electromagnetic sensor that provides local measurements of the hydrate inhibitor concentration.

In the illustrated embodiment, the method includes determining water flow parameters, as represented by block 148. Determining water flow parameters includes determining an expected total water flow rate ($Q_{Wmax}$) based on the flow rate of the condensed water. In certain embodiments, the flow rate of any water within the hydrate inhibitor, an initial determined flow rate of the formation water, an initial determined flow rate of the condensed water, or a combination thereof, may be included in the expected total water flow rate determination. In certain embodiments, the initial determined flow rate of the formation water and/or the initial determined flow rate of the condensed water may be determined during the initial startup of the well/resource extraction system. For example, in certain embodiments (e.g., in embodiments in which the initial determined flow rate of the condensed water and the initial determined flow rate of the formation water are zero), the expected total water flow rate may be equal to the sum of the flow rate of the condensed water and the flow rate of any water within the hydrate inhibitor.

Next, as represented by block 150, which is within section 58, the flow rate of the formation water ($Q_{FW}$) is determined based on the concentration of the hydrate inhibitor ($W_{INH}$) within the multiphase fluid and the expected total water flow rate ($Q_{Wexp}$), as represented by block 148. For example, a higher hydrate inhibitor concentration may be indicative of a lower flow rate of the formation water because less hydrate inhibitor is being consumed/utilized by the water within the multiphase fluid. In addition, a lower hydrate inhibitor concentration may be indicative of a higher flow rate of the formation water because more hydrate inhibitor is being consumed/utilized by the water within the multiphase fluid. The formation water flow rate ($Q_{FW}$) may represent the total flow rate of the formation water or the difference between the total flow rate of the formation water and the initial determined flow rate of the formation water. As illustrated, block 150 is part of a change tracking block 152.

In certain embodiments, action(s) may be performed in response to determining the flow rate of the formation water is greater than or equal to a threshold value. In such embodiments, a maximum enabled water flow rate is determined based on a flow rate of a hydrate inhibitor into the multiphase fluid, as also represented by block 148. As previously discussed, the flow rate of the hydrate inhibitor, as represented by block 74, is a property of the hydrate inhibitor injection, as represented by block 76. The concentration of the hydrate inhibitor (e.g., initial concentration of the hydrate inhibitor before the hydrate inhibitor is received by the multiphase fluid), as represented by block 78, is also a property of the hydrate inhibitor injection. As previously discussed, the hydrate inhibitor may be injected into the multiphase fluid via a hydrate inhibitor injection system, as shown in FIG. 1. The maximum enabled water flow rate corresponds to the flow rate of water that consumes/utilizes all or substantially all of the injected hydrate inhibitor to achieve a target or selected level of inhibition.

Next, as also represented by block 128, a maximum enabled formation water flow rate is determined based on the maximum enabled water flow rate and the flow rate of the condensed water. For example, the maximum enabled formation water flow rate may be determined based on a difference between the maximum enabled water flow rate and the flow rate of the condensed water. In certain embodiments, any water contained within the hydrate inhibitor may also be subtracted from the maximum enabled water flow rate to determine the maximum enabled formation water flow rate. Next, as also represented by block 148, an expected hydrate inhibitor concentration ($W_{INHexp}$) is determined based on the expected total water flow rate ($Q_{Wexp}$). For example, a higher expected total water flow rate may establish a lower expected hydrate inhibitor concentration, and a lower expected total water flow rate may establish a higher expected hydrate inhibitor concentration. A maximum enabled change in total water flow rate ($\Delta Q_{Wmax}$) is then determined, as also represented by block 148, based on the maximum enabled formation water flow rate. For example, in certain embodiments, the multiphase fluid may include an initial determined flow rate of formation water and/or an initial determine flow rate of condensed water, which may be determined during the initial startup of the well/resource extraction system. In such embodiments, the maximum enabled change in total water flow rate may be equal to the maximum enabled formation water flow rate minus the initial determined flow rate of the formation water and/or the initial determined flow rate of the condensed water. However, in certain embodiments, the initial determined flow rate of the formation water and the initial determined flow rate of the condensed water may be zero, and the maximum enabled change in the total water flow rate may be equal to the maximum enabled formation water flow rate.

Next, as represented by block 154, which is part of the change tracking block 152, a maximum enabled change in hydrate inhibitor concentration ($\Delta W_{INHmax}$) is determined based on the maximum enabled change in total water flow rate. For example, the maximum enabled change in hydrate inhibitor concentration may correspond to the hydrate inhibitor concentration sufficient to inhibit all of the water of the maximum enabled water flow rate. A hydrate inhibitor concentration difference ($\Delta W_{INH}$) may then be determined based on a difference between the hydrate inhibitor concentration ($W_{INH}$) within the multiphase fluid and the expected concentration of the hydrate inhibitor ($W_{INHexp}$), as represented by block 156, which is part of the change tracking block 152. As discussed in detail below, an action may be performed in response to determining the hydrate inhibitor concentration difference is greater than or equal to a threshold factor multiplied by the maximum enabled change in hydrate inhibitor concentration. For example, the action may include informing an operator of an excessive flow rate of the formation water, terminating operation of the well/resource extraction system, controlling the flow rate of the hydrate inhibitor, or a combination thereof.

In the illustrated embodiment, two threshold factors ($C_1$, $C_2$) are input (e.g., via the user interface), as represented by block 82. In certain embodiments, each threshold factor may have a value between 0 and 1, and the second threshold factor may be greater than the first threshold factor. In response to determining that the hydrate inhibitor concentration difference ($\Delta W_{INH}$) is less than the first threshold factor ($C_1$) multiplied by the maximum enabled change in hydrate inhibitor concentration ($\Delta W_{INHmax}$), as represented by block 158, no action is taken, as represented by block 86. While the hydrate inhibitor concentration difference is less than the first threshold factor multiplied by the maximum enabled change in hydrate inhibitor concentration, a sufficient amount of hydrate inhibitor is present within the multiphase fluid. Accordingly, an excessive flow rate of the formation water is not present. However, in response to determining that the hydrate inhibitor concentration difference ($\Delta W_{INH}$) is greater than or equal to the first threshold factor ($C_1$) multiplied by the maximum enabled change in hydrate inhibitor concentration ($\Delta W_{INHmax}$), as represented by block 160, the operator may be informed (e.g., via the user interface) of an excessive flow rate of the formation water, as represented by block 90. In addition, in response to determining that the hydrate inhibitor concentration difference ($\Delta W_{INH}$) is greater than or equal to the first threshold factor ($C_1$) multiplied by the maximum enabled change in hydrate inhibitor concentration ($\Delta W_{INHmax}$), as represented by block 160, the flow rate of the hydrate inhibitor into the multiphase fluid may be controlled based on the hydrate inhibitor concentration difference, as represented by block 92. While the hydrate inhibitor concentration difference is greater than or equal to the first threshold factor multiplied by the maximum enabled change in hydrate inhibitor concentration, an insufficient or nearly insufficient amount of hydrate inhibitor may be present within the multiphase fluid. Accordingly, an excessive flow rate of the formation water may be present. Informing the operator may enable the operator to identify the excessive flow rate of the formation water. In addition, automatically controlling the flow rate of the hydrate inhibitor into the multiphase fluid may reduce the hydrate inhibitor concentration difference below the first threshold factor multiplied by the maximum enabled change in hydrate inhibitor concentration. While the operator is informed and the flow rate of the hydrate inhibitor is adjusted in response to determining the hydrate inhibitor concentration difference is greater than or equal to the first threshold factor multiplied by the maximum enabled change in hydrate inhibitor concentration in the illustrated embodiment, in other embodiments, only one of the actions may be performed.

In response to determining that the hydrate inhibitor concentration difference ($\Delta W_{INH}$) is greater than or equal to the second threshold factor ($C_2$) multiplied by the maximum enabled change in hydrate inhibitor concentration ($\Delta W_{INHmax}$), as represented by block 162, operation of the well/resource extraction system may be terminated (e.g., by closing one or more valves of the resource extraction system), as represented by block 96. While operation of the well/resource extraction system is terminated in response to determining the hydrate inhibitor concentration difference is greater than or equal to the second threshold factor multiplied by the maximum enabled change in hydrate inhibitor concentration in the illustrated embodiment, in other embodiments, other and/or additional action(s) may be performed (e.g., informing the operator, adjusting operation of the resource extraction system, etc.). Furthermore, while the method 144 includes two threshold factors in the illustrated embodiment, in other embodiments, the method may include more or fewer threshold factors. For example, in certain embodiments, the method may include a single threshold factor, and one or more actions (e.g., informing the operator, terminating operation, controlling the hydrate inhibitor flow rate, etc.) may be performed in response to determining the hydrate inhibitor concentration difference is greater than or equal to the single threshold factor multiplied by the maximum enabled change in hydrate inhibitor concentration. Furthermore, in certain embodiments, the method may include three or more threshold factors, and for each respective threshold factor, one or more actions may be performed in response to determining the hydrate inhibitor concentration difference is greater than or equal to the respective threshold factor multiplied by the maximum enabled change in hydrate inhibitor concentration. In addition, in certain embodiments, the threshold factor may be omitted from at least one of the comparisons (e.g., the hydrate inhibitor concentration difference may be compared directly to the maximum enabled change in hydrate inhibitor concentration). Because the threshold value(s) used for comparison to the hydrate inhibitor concentration difference are variable (e.g., based on the maximum enabled change in hydrate inhibitor concentration), the action(s) may be initiated more accurately (e.g., as compared to a method that utilizes fixed threshold value(s)). However, in certain embodiments, the hydrate inhibitor concentration difference may be compared to a fixed threshold value within at least one of the comparisons. In addition, any of the comparison steps disclosed above with regard to the methods of FIGS. 2-5 may be based on a threshold duration. For example, at least one action may only be performed in response to the condition being met (e.g., the parameter being greater than or equal to a threshold value) for a threshold duration.

In the illustrated embodiment, the flow rate of the hydrate inhibitor into the multiphase fluid may be manually set/adjusted (e.g., prior to operation of the mineral extraction system, in response to being informed of an excessive flow rate of the formation water, etc.). The manual inputs to the hydrate inhibitor injection system are represented by block 98, which is labeled operating philosophy and reservoir inputs. As represented by block 100, which is an element of block 98, the inputs may include a target hydrate inhibitor dosage, cold point conditions, aquifer salinity (e.g., salinity of the formation water), or a combination thereof. The operating philosophy may include setting the target hydrate inhibitor dosage to a selected percentage above an expected maximum dosage to reduce the possibility of the flow rate of the formation water being excessive (e.g., greater than the capacity of the hydrate inhibitor) and to reduce hydrate inhibitor usage. Furthermore, in certain embodiments, the flow rate of the hydrate inhibitor into the multiphase fluid may be automatically controlled based at least in part on the gas flow rate, as represented by block 56.

As previously discussed with regard to the embodiments of FIGS. 2-5, the flow rate of the hydrate inhibitor may be automatically adjusted (e.g., based on the formation water flow rate). Additionally or alternatively, in certain embodiments the flow rate of other suitable chemicals may be automatically adjusted (e.g., based on the formation water flow rate). For example, the flow rate(s) of one or more water-based chemical(s), such as scale inhibitor(s) and/or corrosion inhibitor(s), may be automatically adjusted based on the formation water flow rate.

Furthermore, with regard to the methods of FIGS. 2-5, one or more output signals indicative of one or more values determined via the method may be output. For example, in certain embodiments, one or more output signals indicative of the flow rate of the formation water may be output, one or more output signals indicative of one or more of the determined flow rates may be output, one or more output signals indicative of one or more other values may be output, or a combination thereof. In certain embodiments, the user interface may receive the output signal(s) and present information indicative of the value(s) to the operator (e.g., via the display of the user interface). In addition, with regard to the methods of FIGS. 2-5, at least one method may include a step of determining whether the hydrate inhibitor injection flow rate has reached a maximum (e.g., as determined based on the capacity of the hydrate inhibitor injection system). In response to determining the hydrate inhibitor injection flow rate has reached a maximum, an action may be performed, such as informing the operator and/or terminating operation of the resource extraction system/well.

Technical effects of the disclosure include enhancing the accuracy of the formation water flow rate determination. For example, because the flow rate of the formation water is determined based on the flow rate of the condensed water, the accuracy of the formation water flow rate determination may be enhanced (e.g., as compared to a determination of formation water flow rate that does not utilize the flow rate of the condensed water). As a result, hydrate inhibitor injection flow rates may be more accurately determined and/or controlled, thereby reducing hydrate inhibitor usage and enabling system designs to be enhanced (e.g., by reducing engineering margins that address uncertainties). Furthermore, because the threshold value(s) used for comparison to the salinity difference/water liquid ratio difference/formation water flow rate/hydrate inhibitor concentration difference are variable, the respective action(s) may be initiated more accurately (e.g., as compared to a method that utilizes fixed threshold value(s)).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A water detection and measurement system for a resource extraction system, the water detection and measurement system comprising:
    a controller comprising a memory and a processor, wherein the controller is configured to:
        receive one or more first sensor signals indicative of a pressure of a multiphase fluid;

receive one or more second sensor signals indicative of a temperature of the multiphase fluid;

determine a fraction of condensed water within the multiphase fluid based on the pressure of the multiphase fluid and the temperature of the multiphase fluid;

determine a flow rate of the condensed water within the multiphase fluid based on the fraction of the condensed water within the multiphase fluid and a gas flow rate of the multiphase fluid;

receive one or more third sensor signals indicative of a fluid parameter of the multiphase fluid, wherein the fluid parameter comprises a concentration of a hydrate inhibitor within the multiphase fluid;

determine an expected total water flow rate based on the flow rate of the condensed water within the multiphase fluid; and determine a flow rate of formation water within the multiphase fluid based on the concentration of the hydrate inhibitor within the multiphase fluid, the expected total water flow rate, and the flow rate of the condensed water within the multiphase fluid; and output one or more output signals indicative of the flow rate of the formation water within the multiphase fluid.

2. The water detection and measurement system of claim 1, wherein:

the fluid parameter comprises a water mixture salinity of the multiphase fluid; and the controller is further configured to:
determine an expected water mixture salinity based on a salinity of the condensed water;
determine a salinity difference based on a difference between the water mixture salinity of the multiphase fluid and the expected water mixture salinity; and
determine the flow rate of the formation water within the multiphase fluid based on the salinity difference and the flow rate of the condensed water within the multiphase fluid.

3. The water detection and measurement system of claim 2, wherein the controller is further configured to:

determine a maximum enabled water flow rate based on a flow rate of a hydrate inhibitor into the multiphase fluid;

determine a maximum enabled formation water flow rate based on the maximum enabled water flow rate and the flow rate of the condensed water within the multiphase fluid;

determine a maximum enabled water mixture salinity based on the maximum enabled formation water flow rate, a salinity of the formation water within the multiphase fluid, and the flow rate of the condensed water within the multiphase fluid;

determine a maximum enabled water mixture salinity difference based on a difference between the maximum enabled water mixture salinity and the expected water mixture salinity; and perform an action in response to determining the salinity difference is greater than or equal to a threshold factor multiplied by the maximum enabled water mixture salinity difference.

4. The water detection and measurement system of claim 3, wherein the action comprises informing an operator of an excessive flow rate of the formation water, terminating operation of the resource extraction system, controlling the flow rate of the hydrate inhibitor into the multiphase fluid, or a combination thereof.

5. The water detection and measurement system of claim 1, wherein:

the fluid parameter comprises a water liquid ratio of the multiphase fluid; and the controller is further configured to:
determine a fraction of liquid hydrocarbon within the multiphase fluid based on the pressure of the multiphase fluid and the temperature of the multiphase fluid;
determine a flow rate of the liquid hydrocarbon within the multiphase fluid based on the fraction of the liquid hydrocarbon within the multiphase fluid and the gas flow rate of the multiphase fluid;
determine an expected water liquid ratio based on the flow rate of the condensed water within the multiphase fluid and the flow rate of the liquid hydrocarbon within the multiphase fluid;
determine a water liquid ratio difference based on a difference between the water liquid ratio of the multiphase fluid and the expected water liquid ratio; and
determine the flow rate of the formation water within the multiphase fluid based on the water liquid ratio difference and the flow rate of the condensed water within the multiphase fluid.

6. The water detection and measurement system of claim 5, wherein the controller is further configured to:

determine a maximum enabled water flow rate based on a flow rate of a hydrate inhibitor into the multiphase fluid;

determine a maximum enabled formation water flow rate based on the maximum enabled water flow rate and the flow rate of the condensed water within the multiphase fluid;

determine a maximum enabled water liquid ratio based on the maximum enabled formation water flow rate, the flow rate of the condensed water within the multiphase fluid, and the flow rate of the liquid hydrocarbon within the multiphase fluid;

determine a maximum enabled water liquid ratio difference based on a difference between the maximum enabled water liquid ratio and the expected water liquid ratio; and perform an action in response to determining the water liquid ratio difference is greater than or equal to a threshold factor multiplied by the maximum enabled water liquid ratio difference.

7. The water detection and measurement system of claim 6, wherein the action comprises informing an operator of an excessive flow rate of the formation water, terminating operation of the resource extraction system, controlling the flow rate of the hydrate inhibitor into the multiphase fluid, or a combination thereof.

8. The water detection and measurement system of claim 1, wherein:

the fluid parameter comprises a water fraction of the multiphase fluid; and the controller is further configured to:
determine the expected total water flow rate based on the flow rate of the condensed water within the multiphase fluid; and
determine a total water flow rate based on the water fraction; and
determine the flow rate of the formation water within the multiphase fluid based on a difference between the total water flow rate and the expected total water flow rate.

9. The water detection and measurement system of claim 8, wherein the controller is further configured to:
- determine a maximum enabled water flow rate based on a flow rate of a hydrate inhibitor into the multiphase fluid;
- determine a maximum enabled formation water flow rate based on the maximum enabled water flow rate and the expected total water flow rate;
- determine a maximum enabled change in total water flow rate based on the maximum enabled formation water flow rate; and
- perform an action in response to determining the formation water flow rate is greater than or equal to a threshold factor multiplied by the maximum enabled change in total water flow rate.

10. The water detection and measurement system of claim 9, wherein the action comprises informing an operator of an excessive formation flow rate, terminating operation of the resource extraction system, controlling the flow rate of the hydrate inhibitor into the multiphase fluid, or a combination thereof.

11. The water detection and measurement system of claim 1, wherein the controller is further configured to:
- determine a maximum enabled water flow rate based on a flow rate of a hydrate inhibitor into the multiphase fluid;
- determine a maximum enabled formation water flow rate based on the maximum enabled water flow rate and the expected total water flow rate;
- determine an expected hydrate inhibitor concentration within the multiphase fluid based on the expected total water flow rate;
- determine a maximum enabled change in total water flow rate based on the maximum enabled formation water flow rate;
- determine a maximum enabled change in hydrate inhibitor concentration based on the maximum enabled change in total water flow rate;
- determine a hydrate inhibitor concentration difference based on a difference between the hydrate inhibitor concentration within the multiphase fluid and the expected concentration of the hydrate inhibitor within the multiphase fluid; and
- perform an action in response to determining the hydrate inhibitor concentration difference is greater than or equal to a threshold factor multiplied by the maximum enabled change in hydrate inhibitor concentration.

12. The water detection and measurement system of claim 11, wherein the action comprises informing an operator of an excessive flow rate of the formation water within the multiphase fluid, terminating operation of the resource extraction system, controlling the flow rate of the hydrate inhibitor, or a combination thereof.

13. The water detection and measurement system of claim 1, wherein the controller is further configured to receive one or more fourth sensor signals indicative of the gas flow rate of the multiphase fluid.

14. A method for detection and measurement of water within a resource extraction system, the method comprising:
- receiving, via a controller having a memory and a processor, one or more first sensor signals indicative of a pressure of a multiphase fluid;
- receiving, via the controller, one or more second sensor signals indicative of a temperature of the multiphase fluid;
- determining, via the controller, a fraction of condensed water within the multiphase fluid based on the pressure of the multiphase fluid and the temperature of the multiphase fluid;
- determining, via the controller, a flow rate of the condensed water based on the fraction of the condensed water within the multiphase fluid and a gas flow rate of the multiphase fluid;
- receiving, via the controller, one or more third sensor signals indicative of a fluid parameter of the multiphase fluid, wherein the fluid parameter comprises a concentration of a hydrate inhibitor within the multiphase fluid;
- determining, via the controller, an expected total water flow rate based on the flow rate of the condensed water within the multiphase fluid; and
- determining, via the controller, a flow rate of formation water within the multiphase fluid based on the concentration of the hydrate inhibitor within the multiphase fluid, the expected total water flow rate, and the flow rate of the condensed water within the multiphase fluid; and
- outputting, via the controller, one or more output signals indicative of the flow rate of the formation water.

15. The method of claim 14, wherein:
the fluid parameter comprises a water mixture salinity; and
the method further comprises:
- determining, via the controller, an expected water mixture salinity based on a salinity of the condensed water within the multiphase fluid;
- determining, via the controller, a salinity difference based on a difference between the water mixture salinity and the expected water mixture salinity; and
- determining the flow rate of the formation water based on the salinity difference and the flow rate of the condensed water within the multiphase fluid.

16. The method of claim 14, wherein:
the fluid parameter comprises a water liquid ratio; and
the method further comprises:
- determining, via the controller, a fraction of liquid hydrocarbon within the multiphase fluid based on the pressure of the multiphase fluid and the temperature of the multiphase fluid;
- determining, via the controller, a flow rate of the liquid hydrocarbon based on the fraction of the liquid hydrocarbon within the multiphase fluid and the gas flow rate of the multiphase fluid;
- determining, via the controller, an expected water liquid ratio based on the flow rate of the condensed water within the multiphase fluid and the flow rate of the liquid hydrocarbon within the multiphase fluid;
- determining, via the controller, a water liquid ratio difference based on a difference between the water liquid ratio and the expected water liquid ratio; and
- wherein determining, via the controller, the flow rate of the formation water based on the water liquid ratio difference and the flow rate of the condensed water within the multiphase fluid.

17. The method of claim 14, wherein:
the fluid parameter comprises a water fraction; and
the method further comprises:
- determining, via the controller, an expected total water flow rate based on the flow rate of the condensed water; and
- determining, via the controller, a total water flow rate based on the water fraction; and determining, via the controller, the flow rate of the formation water based on a difference between the total water flow rate and the expected total water flow rate.

18. One or more tangible, non-transitory, machine-readable media comprising instructions configured to cause a processor of a controller of a resource extraction system to:
receive, via the controller, one or more first sensor signals indicative of a pressure of a multiphase fluid;
receive, via the controller, one or more second sensor signals indicative of a temperature of the multiphase fluid;
determine, via the controller, a fraction of condensed water within the multiphase fluid based on the pressure of the multiphase fluid and the temperature of the multiphase fluid;
determine, via the controller, a flow rate of the condensed water based on the fraction of the condensed water within the multiphase fluid and a gas flow rate of the multiphase fluid;
receive, via the controller, one or more third sensor signals indicative of a fluid parameter of the multiphase fluid, wherein the fluid parameter comprises a concentration of a hydrate inhibitor within the multiphase fluid;
determine, via the controller, an expected total water flow rate based on the flow rate of the condensed water within the multiphase fluid; and
determine, via the controller, a flow rate of formation water within the multiphase fluid based on the concentration of the hydrate inhibitor within the multiphase fluid, the expected total water flow rate, and the flow rate of the condensed water within the multiphase fluid; and
perform, via the controller, an action in response to the flow rate of the formation water exceeding a threshold value, wherein the instructions are configured to cause the processor of the controller to inform an operator of an excessive flow rate of the formation water within the multiphase fluid, terminate operation of the resource extraction system, control a flow rate of a hydrate inhibitor into the multiphase fluid, or a combination thereof.

19. The one or more tangible, non-transitory, machine-readable media of claim 18, wherein the instructions are further configured to cause the processor of the controller of the resource extraction system to:
determine a maximum enabled water flow rate based on the flow rate of the hydrate inhibitor into the multiphase fluid;
determine a maximum enabled formation water flow rate based on the maximum enabled water flow rate and the expected total water flow rate;
determine an expected hydrate inhibitor concentration within the multiphase fluid based on the expected total water flow rate;
determine a maximum enabled change in total water flow rate based on the maximum enabled formation water flow rate;
determine a maximum enabled change in hydrate inhibitor concentration based on the maximum enabled change in total water flow rate;
determine a hydrate inhibitor concentration difference based on a difference between the hydrate inhibitor concentration within the multiphase fluid and the expected concentration of the hydrate inhibitor within the multiphase fluid; and
perform an action in response to determining the hydrate inhibitor concentration difference is greater than or equal to a threshold factor multiplied by the maximum enabled change in hydrate inhibitor concentration.

20. The one or more tangible, non-transitory, machine-readable media of claim 18, wherein the instructions are further configured to cause the processor of the controller of the resource extraction system to receive one or more fourth sensor signals indicative of the gas flow rate of the multiphase fluid.

* * * * *